United States Patent
Iisaka et al.

(10) Patent No.: US 7,236,158 B2
(45) Date of Patent: Jun. 26, 2007

(54) TRACKBALL AND IN-VEHICLE DEVICE CONTROLLER USING THE TRACKBALL

(75) Inventors: Atsushi Iisaka, Katano (JP); Kiyomi Sakamoto, Ikoma (JP); Atsushi Yamashita, Osaka (JP); Michiharu Honda, Hirakata (JP); Takatoshi Ono, Soraku-gun (JP); Takefumi Inoue, Ikoma-gun (JP); Kiyotaka Sasanouchi, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 425 days.

(21) Appl. No.: 10/667,502

(22) Filed: Sep. 23, 2003

(65) Prior Publication Data

US 2004/0056842 A1 Mar. 25, 2004

(30) Foreign Application Priority Data

Sep. 24, 2002 (JP) ............................. 2002-277004

(51) Int. Cl.
*G09G 5/08* (2006.01)
(52) U.S. Cl. ...................................... 345/167; 345/164
(58) Field of Classification Search ................ 345/167, 345/156, 157, 184, 164
See application file for complete search history.

(56) References Cited

U.S. PATENT DOCUMENTS 5,021,771 A * 6/1991 Lachman .................... 345/164
5,620,371 A * 4/1997 Blonder ........................ 463/37
6,501,458 B2 * 12/2002 Baker et al. ................. 345/161
6,504,528 B1 * 1/2003 Kermani et al. ............ 345/163
2002/0084983 A1 * 7/2002 Boldy ......................... 345/157

FOREIGN PATENT DOCUMENTS

JP 9-282088 10/1997
JP 2002-140160 5/2002

* cited by examiner

*Primary Examiner*—Sumati Lefkowitz
*Assistant Examiner*—Seokyun Moon
(74) *Attorney, Agent, or Firm*—Wenderoth, Lind & Ponack, L.L.P.

(57) ABSTRACT

The present invention provides a trackball and an in-vehicle device controller using the trackball. The trackball provides a stable operational feel and is easy to operate even in an environment in a vehicle where vibration and movement are present. The trackball includes a ball made of a non-magnetic material and having embedded therein bar members made of a magnetic material and arranged on three axes orthogonal to one another, a case enclosing the ball such that at least an upper portion of the ball is exposed, magnetic members fixed to the case on two axes penetrating through the center of the ball and orthogonal to each other so as to allow magnetic coupling to ends of the bar members, and another magnetic member fixed to the case on an axis penetrating through the center of the ball and orthogonal to the two axes so as to allow magnetic coupling to an end of one of the bar members.

12 Claims, 18 Drawing Sheets

TRACKBALL AND IN-VEHICLE DEVICE CONTROLLER USING THE TRACKBALL

BACKGROUND OF THE INVENTION

1. Field of the Invention

The present invention relates to a trackball used for controlling electronic devices and an in-vehicle device controller using the trackball. More particularly, the present invention relates to a trackball which is capable of providing the user with a feel of rotating a ball included in the trackball and to an in-vehicle device controller using such a trackball.

2. Description of the Background Art

A trackball is a device used for controlling electronic devices by rotating a ball included in the trackball.

In cases where a trackball is used to operate a personal computer, it is desirable for the pointer on the PC screen to be able to make minute movements in response to movement of the trackball's ball. Thus, it is preferable that a ball included in such a trackball rotate smoothly without interruption of movement while rotating and without giving the user an awkward feel.

On the other hand, in cases where a trackball is used to control the set temperature, etc., in an air-conditioning system, the cursor on a control screen only needs to be able to move in a stepwise manner, and there is no need for the cursor to move smoothly. Therefore, it is preferable that a ball included in such a trackball rotate intermittently in a manner such that the ball rests stably once at a stage where the ball has rotated a predetermined angle to give the user a resistance feel and then again begins rotating as the user applies further force. The feel given to the user when the ball makes such a movement is hereinbelow called a crisp click. The user can, by obtaining a crisp click, intuitively adjust a set temperature, etc., and can obtain a good operational feel.

Conventionally, trackballs that provide a crisp click have been suggested (see Japanese Laid-Open Patent Publication No. 2002-140160).

FIG. 20 is a cross-sectional view of a conventional trackball 200 that provides a crisp click. In FIG. 20, the trackball 200 includes a ball 221, a case 222, four fixed magnetic members 231 to 234 (note that the magnetic members 232 and 234 extend in a direction perpendicular to the plane of FIG. 20 and thus are shown by a dotted line in FIG. 20), and magnetic sensors 236A, 236B, 237A, and 237B (note that the magnetic sensor 237B is present at the far end along a direction perpendicular to the plane of FIG. 20 and thus reference numeral 237B is shown in parentheses in FIG. 20).

The ball 221 has included therein three bar members 226, 227, and 228 arranged on three axes that intersect with one another at the center of the ball 221 and are orthogonal to one another. The bar members 226, 227, and 228 are made of an unmagnetized magnetic material, such as iron, and are embedded inside the ball 221.

The case 222 is used to rotatably support the ball 221. The fixed magnetic members 231 to 234 are disposed on the inner surface of the case 222 on two axes orthogonal to each other on a horizontal plane penetrating through the center of the ball 221, so as not to contact with the ball 221.

The magnetic sensors 236A and 236B are provided to detect a rotation of the ball 221 in the longitudinal direction. The magnetic sensors 237A and 237B are provided to detect a rotation of the ball 221 in the transverse direction.

Among the three bar members 226, 227, and 228 embedded in the ball 221, any two bar members present on the same plane are attracted by the magnetic force of the fixed magnetic members 231 to 234. Therefore, for example, in a state shown in FIG. 20, by the force with which the fixed magnetic members 231 and 233 attract the bar member 226, a magnetic-force-based rotation axis emerges between the fixed magnetic members 231 and 233. In addition, by the force with which the fixed magnetic members 232 and 234 attract the bar member 227, a magnetic-force-based rotation axis emerges between the fixed magnetic members 232 and 234. Thus, the user can rotate the ball 221 around either of these axes.

For example, when a force is applied to the ball 221 in a Y direction (see the arrow in FIG. 20), the ball 221 rotates around the rotation axis connecting between the fixed magnetic members 232 and 234. Here, since the bar member 226 is attracted to the fixed magnetic members 231 and 233, the user feels the magnetic force of the fixed magnetic members 231 and 233 while applying a force to the ball 221. As the rotation of the ball 221 proceeds, the bar member 228 is attracted to the fixed magnetic members 231 and 233. When the ball 221 has been rotated by 90°, the bar member 228 is attracted to the fixed magnetic members 231 and 233. Consequently, the ball 221 stops stably. If the ball 221 is further allowed to rotate, the user would feel the magnetic force acting between the bar member 228 and the fixed magnetic members 231 and 233, as a resistance. Accordingly, the user can feel that the ball 221 rotates without play, and can obtain a crisp click every 90° rotation.

In the above-described conventional trackball, however, by the force that the user applies to the ball, the distance between the ball and the fixed magnetic members changes slightly. This causes a great change in the magnetic coupling between the ball and the fixed magnetic members. Hence, when the ball is allowed to rotate, the force of the bar members embedded in the ball and the fixed magnetic members fixed to the case wanting to come into contact with one another acts strongly. As a result, an operational feel given to the user is not always satisfactory.

SUMMARY OF THE INVENTION

Therefore, an object of the present invention is to provide a trackball that provides, in performing an operation of rotating the ball, a stable crisp click without rotational play to the user.

Another object of the present invention is to provide a trackball that provides stable operability even in an environment in a vehicle where vibration and movement are present, and an in-vehicle device controller that assists the user with easy control of devices mounted in a vehicle, such as an air-conditioning system, a navigation system, and an audio system.

The present invention has the following features to attain the objects mentioned above. A first aspect of the present invention is directed to a trackball for inputting operation information to electronic devices. The trackball comprises: a ball portion magnetically coupleable in directions of a first axis and a second axis, where the first and second axes intersect with each other at the center of the ball portion and are orthogonal to each other; a case portion for enclosing the ball portion such that an upper portion of the ball portion is exposed; a first magnet portion for stabilizing the ball portion at predetermined rotation angles by magnetically coupling to the ball portion in one of the axial directions; and a second magnet portion for attracting the ball portion in a direction orthogonal to a rotation axis of the ball portion, by magnetically coupling to the ball portion in the other one of the axial directions.

The ball portion may preferably be magnetically coupleable in a direction of a third axis intersecting with the first and second axes at the center of the ball portion and orthogonal to the first and second axes. The first magnet portion may allow each of any two axes among the first to third axes which are present on the same plane to serve as a rotation axis of the ball portion.

In a preferred embodiment, the ball portion may preferably comprise first to third bar members respectively arranged on the first to third axes and made of an unmagnetized magnetic material. The first magnet portion may comprise: a first fixed magnet portion made up of a pair of magnets for forming a first rotation axis by magnetically coupling to the first bar member, where the magnets are respectively fixed to side-surfaces of the case portion; and a second fixed magnet portion made up of a pair of magnets for forming a second rotation axis by magnetically coupling to the second bar member, where the magnets are respectively fixed to side-surfaces of the case portion. The second magnet portion may comprise a third fixed magnet portion for attracting the third bar member by magnetically coupling to the third bar member, where the third fixed magnet portion is fixed to a bottom-surface of the case portion.

Furthermore, the ball portion may further comprise an even number of bar members respectively arranged on an even number of axes and made of an unmagnetized magnetic material, where the even number of axes intersect at an intersection point of any two axes among the first to third axes which are present on the same plane, and at equal angles.

The case portion may preferably be made of an unmagnetized magnetic material.

In another preferred embodiment, the above-described trackball may preferably further comprise a third magnet portion which is arranged at a location that makes a predetermined angle from any one of rotation axes formed by the first magnet portion, and which stabilizes the ball portion by magnetic coupling when the ball portion rotates around any one of the rotation axes. In this embodiment, the trackball may preferably further comprise means for switching between a presence and absence of a magnetic force of the third magnet portion. The magnetic force switching means may preferably perform the switching in accordance with control parameters of the electronic devices.

In all of the above-described embodiments, the magnetic force of the second magnet portion may be greater than the magnetic force of the first magnet portion. Specifically, the magnetic force of the second magnet portion is preferably twice that of the first magnet portion.

In still another preferred embodiment, the ball portion may be magnetically coupleable in directions of a plurality of axes on a plane made up of the first and second axes, where the plurality of axes intersect at an intersection point of the first and second axes. The case portion may expose the upper portion of the ball portion so as to restrict a rotation angle of the ball portion. Specifically, the plurality of axes may be in an even number. The ball portion may comprise: first and second bar members respectively arranged on the first and second axes and made of an unmagnetized magnetic material; and an even number of bar members respectively arranged on the plurality of axes and made of an unmagnetized magnetic material. The first bar member, the second bar member, and the plurality of bar members may be arranged with an equal angle therebetween. The case portion may expose the upper portion of the ball portion such that the ball portion rotates at an angle corresponding to an angle between the bar members.

A trackball such as that described above may be applied to an in-vehicle device controller for controlling electronic devices mounted on a vehicle. In addition, the trackball may be mounted on a steering wheel of the vehicle.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
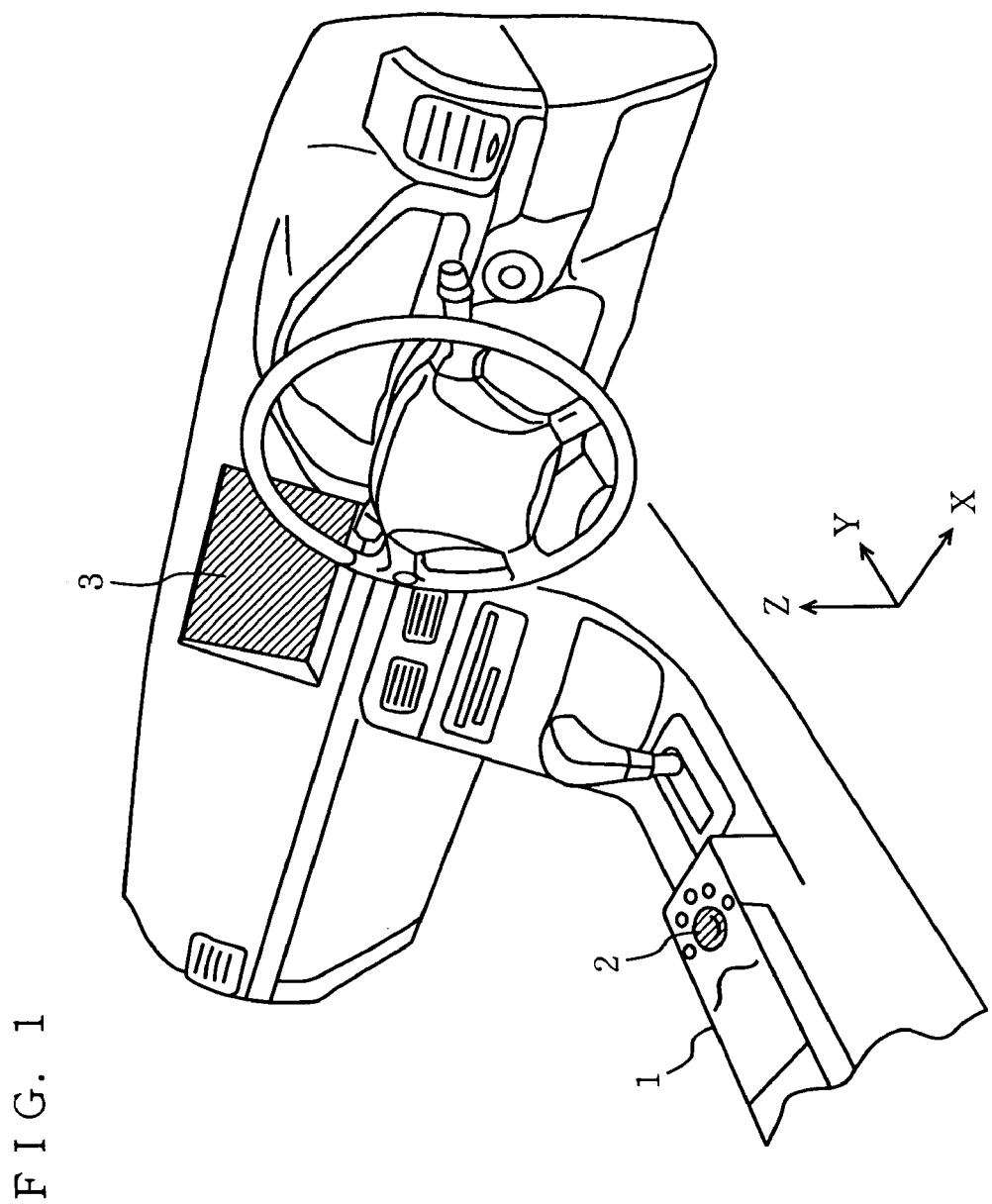
FIG. 1 is an external perspective diagram showing a cockpit of a vehicle equipped with a trackball according to a first embodiment of the present invention.

FIG. 1 is an external perspective diagram showing a cockpit of a vehicle equipped with a trackball according to a first embodiment of the present invention. In FIG. 1, the cockpit of the vehicle includes an in-vehicle device controller 1, a trackball 2, and a display 3. The trackball 2 is mounted on the in-vehicle device controller 1. For describing the rotation direction of a ball included in the trackball 2, X, Y, and Z axes are provided in FIG. 1 to show directions. It is to be noted that in FIG. 1, for clarification, the center of the X, Y, and Z axes is provided away from the trackball 2, but in the following description the center of the X, Y, and Z axes lies in the center of the ball included in the trackball 2. The X axis indicates the left and right direction of the vehicle. The Y axis indicates the forward and backward direction of the vehicle. The Z axis indicates the vertical direction of the vehicle.

As shown in FIG. 1, the in-vehicle device controller 1 is provided at an extension of the center console of the vehicle between the driver's seat and the front seat. Therefore, a driver or a passenger in the front seat can operate the in-vehicle device controller 1 by hand. Objects to be controlled by the in-vehicle device controller 1 include electronic devices, such as a navigation system, an audio system, an air-conditioning system, and a TV mounted on a vehicle (hereinafter referred to as in-vehicle devices). The display 3 displays menu screens for controlling various in-vehicle devices.

Figure 2:
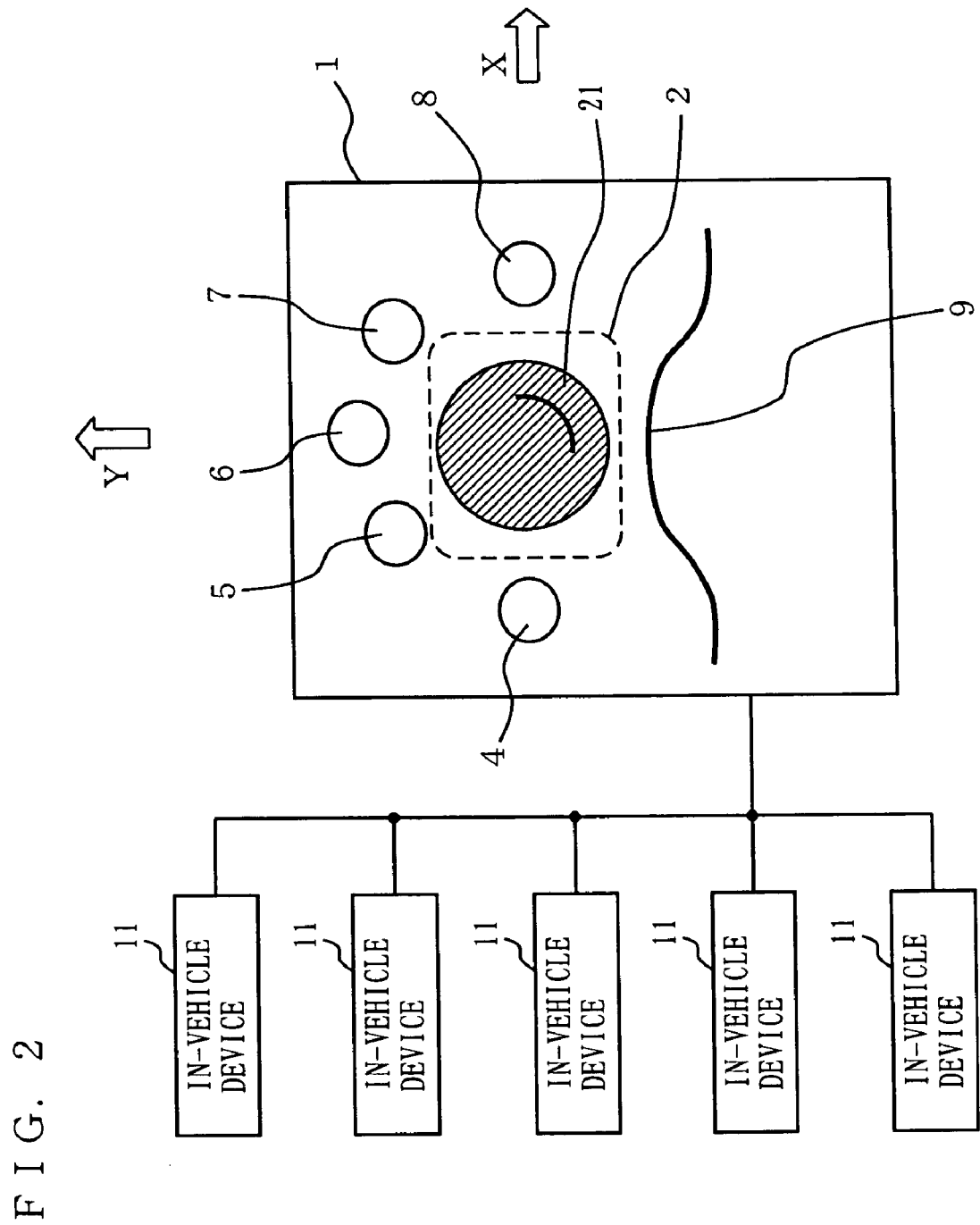
FIG. 2 is a schematic diagram showing the external view of an in-vehicle device controller 1 and the configuration of an in-vehicle system to which the in-vehicle device controller 1 is applied.

FIG. 2 is a schematic diagram showing the external view of the in-vehicle device controller 1 and the configuration of an in-vehicle system to which the in-vehicle device controller 1 is applied. In FIG. 2, for the X, Y, and Z axes, their forward directions are indicated by using arrows (the same applies to the remaining drawings). Each in-vehicle device 11 is connected to the in-vehicle device controller 1 by communication means, such as a serial communication. The user can control the in-vehicle device 11 by operating the in-vehicle device controller 1. The in-vehicle device 11 sends information concerning its menu screen to the in-vehicle device controller 1.

The in-vehicle device controller 1 includes buttons 4 to 8, the trackball 2, and a rest portion 9. The buttons 4 to 8 are provided to select any of the in-vehicle devices 11 to be controlled. The number of buttons 4 to 8 is five to match the number of fingers on one hand. The buttons 4 to 8 are arranged such that the user can press the buttons without looking. The trackball 2 is a device used for controlling the in-vehicle device 11 that has been selected as a control object by any of the buttons 4 to 8. The user controls the in-vehicle device 11 by rotating a ball 21 of the trackball 2. The rest portion 9 has a shape such that the operator's hand fits therein so that the portion of the hand from the wrist to the palm is stably rested when rotating the ball 21, thereby achieving an easy operation of the ball 21.

Figure 3:
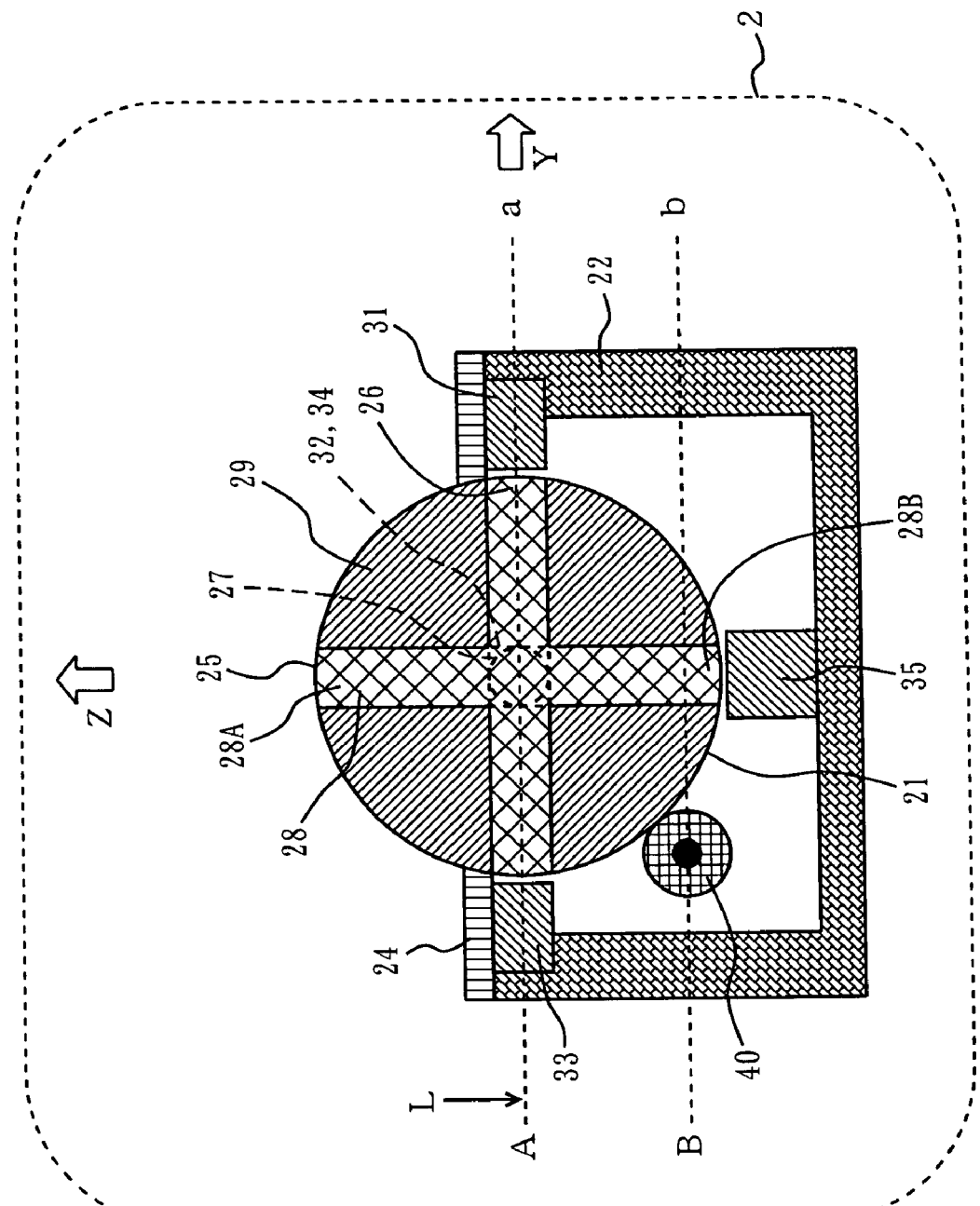
FIG. 3 is a cross-sectional view of a trackball 2 taken along a YZ plane.
Figure 4:
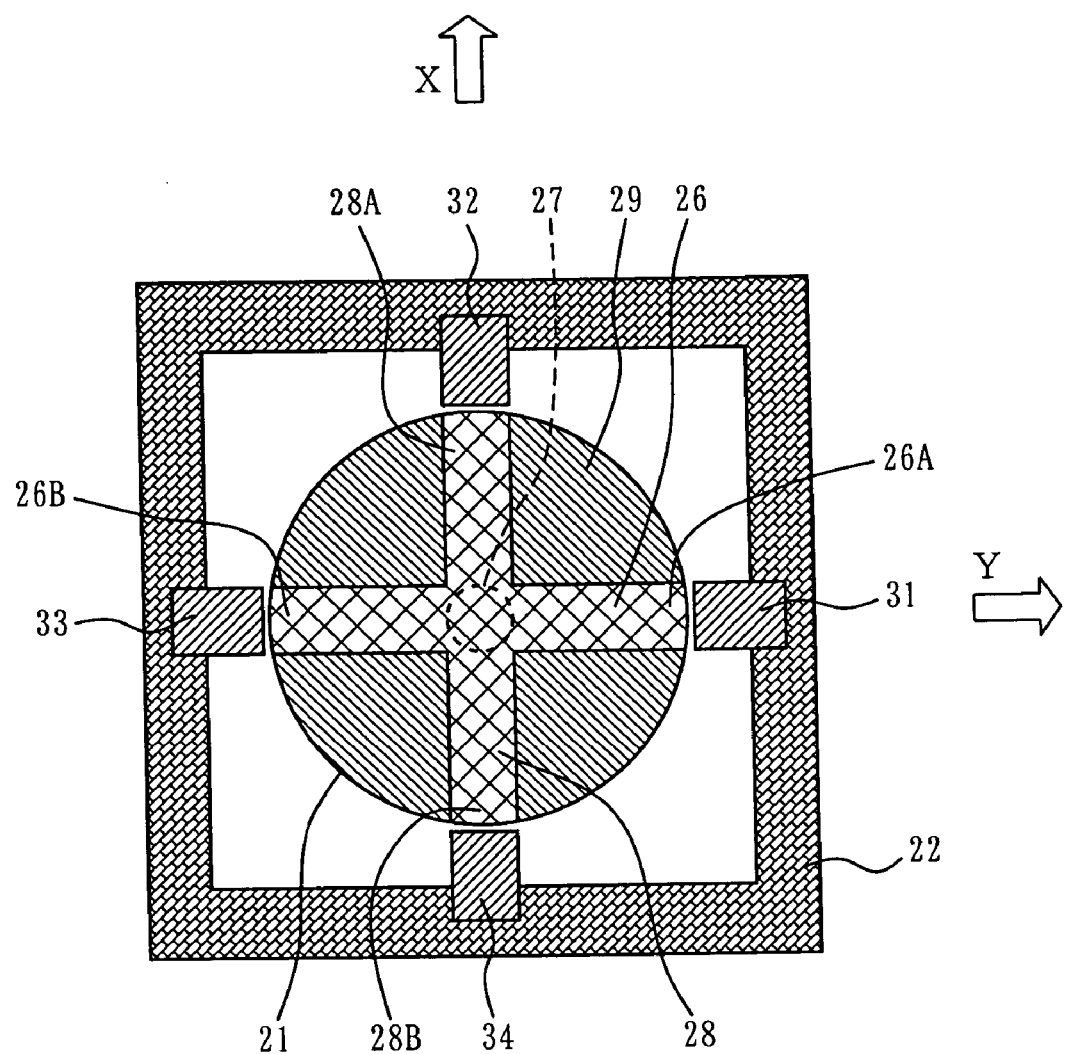
FIG. 4 is a cross-sectional view of the trackball 2 taken along a horizontal center plane A-a shown in FIG. 3, viewed from the direction of the arrow L.
Figure 5:
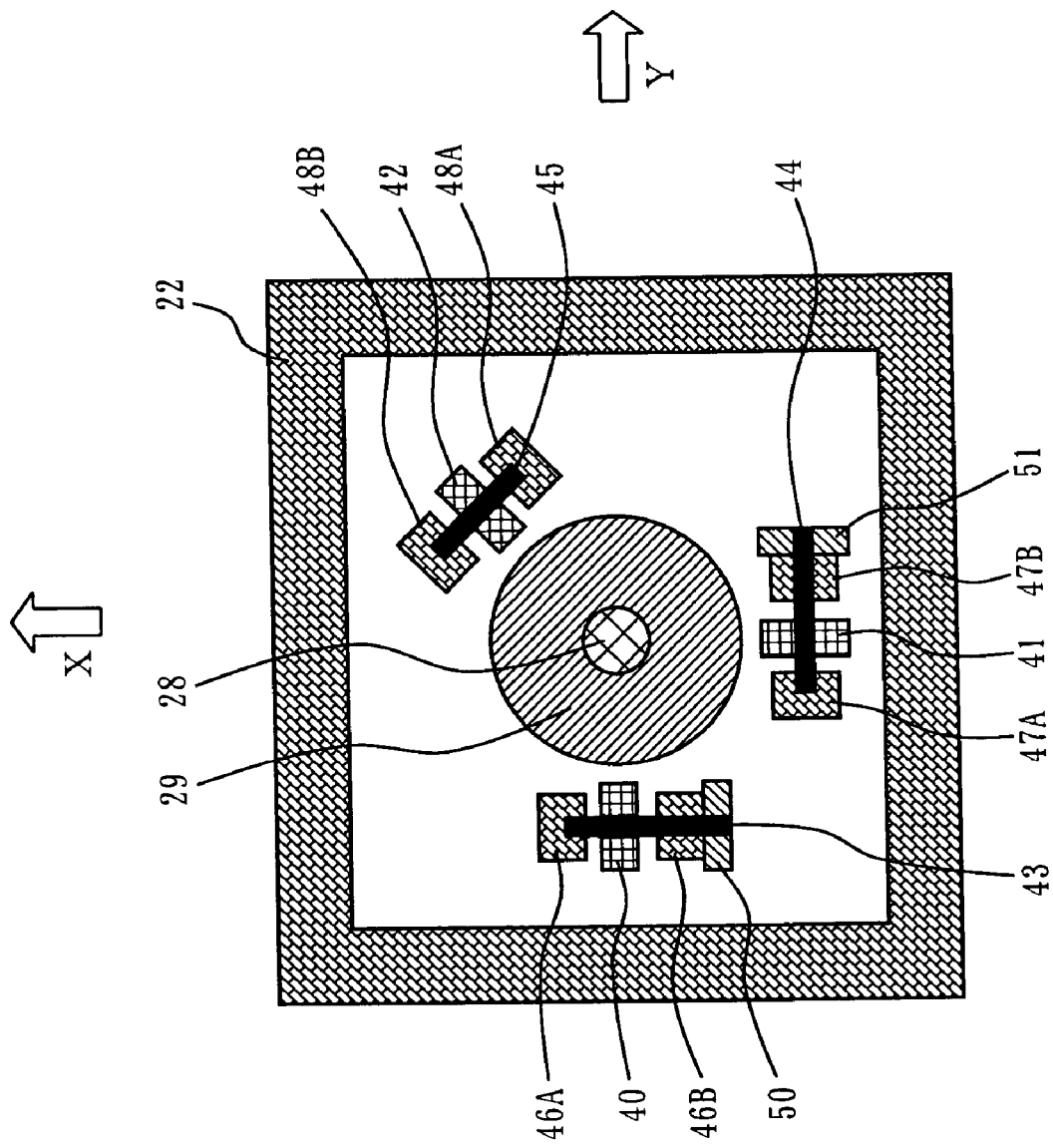
FIG. 5 is a cross-sectional view of the trackball 2 taken along a horizontal center plane B-b shown in FIG. 3, viewed from the direction of the arrow L.

Next, with reference to FIGS. 3 to 5, the structure of the trackball 2 is described. FIG. 3 is a cross-sectional view of the trackball 2 taken along a YZ plane. FIG. 4 is a cross-sectional view of the trackball 2 taken along a horizontal center plane A-a shown in FIG. 3, viewed from the direction of the arrow L. FIG. 5 is a cross-sectional view of the trackball 2 taken along a horizontal center plane B-b shown in FIG. 3, viewed from the direction of the arrow L.

The trackball 2 includes a spherical ball 21, a case 22 made of iron for enclosing the ball 21, a cover plate 24 for covering the case 22 such that the upper portion of the ball 21 protrudes from the cover plate 24, first to fourth fixed magnetic members 31, 32, 33, and 34, rollers 40, 41, and 42, shafts 43, 44, and 45, shaft bearings 46A, 46B, 47A, 47B, 48A, and 48B, and rotary encoders 50 and 51.

The ball 21 includes a moving-magnet member 25 made of an unmagnetized, soft magnetic material, and a resin portion 29 made of a non-magnetic material. The moving-magnet member 25 has three bar members 26, 27, and 28. The bar members 26, 27, and 28 are arranged on three axes (X, Y, and Z axes) orthogonal to one another and are embedded in the resin portion 29. The bar members 26, 27, and 28 each have a length such that both ends thereof are present near the vicinity of the surface of the ball 21. The entire surface of the ball 21 is preferably covered, for example, with a hard and smooth insulating coating. As shown in FIG. 5, the ball 21 is supported by the three rollers 40, 41, and 42 with the lower part from the center of the ball 21 rotatable in all directions. The upper portion of the ball 21 is exposed from a round hole in the center of the cover plate 24.

The rollers 40 and 41 are provided so that their rotation axes are orthogonal to each other. The rollers 40, 41, and 42 are respectively joined to the shafts 43, 44, and 45 penetrating through the center of the rollers such that the rollers do not slide on the respective shafts. The shafts 43, 44, and 45 are rotatably supported by the shaft bearings 46A and 46B, 47A and 47B, and 48A and 48B fixed to the case 22, respectively. The rotary encoders 50 and 51 are connected to the shafts 43 and 44, respectively. The rotary encoders 50 and 51 detect the rotation direction and rotation amount of the rollers 40 and 41, respectively. A detection portion (not shown in the figures) connected to the rotary encoders 50 and 51 detects movement of the ball 21 rotating around the two shafts 43 and 44, based on the rotation direction and rotation amount of the ball 21 obtained from the rotary encoders 50 and 51.

As shown in FIG. 4, the first to fourth fixed magnetic members 31 to 34 are bonded and fixed to the case 22 so as to be aligned on the X and Y axes of an XY plane that penetrates through the center of the ball 21. A given space is provided between each of the first to fourth fixed magnetic members 31 to 34 and the surface of the ball 21. The first to fourth fixed magnetic members 31 to 34 all have the same pole (e.g., north pole) directed toward the center of the ball 21, and are magnetized to have substantially the same magnetic charge. The first to fourth fixed magnetic members 31 to 34 are to be magnetically coupled to both ends 26A, 26B, 27A, 27B, 28A, and 28B of the three bar members 26 to 28 embedded in the ball 21. The first to fourth fixed magnetic members 31 to 34 have a cuboid shape. The first to fourth fixed magnetic members 31 to 34 are made of, for example, a rare-earth magnet which, though small in size, generates a powerful magnetic coupling and is easy to process. The first to fourth fixed magnetic members 31 to 34 all have the same magnetic force.

As shown in FIG. 3, a fifth fixed magnetic member 35 is bonded and fixed at the center of the bottom part of the case 22, i.e., in the reversed direction of a Z axis penetrating through the center of the ball 21. A given space is provided between the fifth fixed magnetic member 35 and the surface of the ball 21. The fifth fixed magnetic member 35 has a pole opposite (e.g., south pole) to that of the first to fourth fixed magnetic members 31 to 34 directed toward the center of the ball 21, and is magnetized to have a magnetic charge about twice the magnetic charge of the first to fourth fixed magnetic members 31 to 34. The fifth fixed magnetic member 35 is magnetically coupled to one end of any of the three bar members 26 to 28 embedded in the ball 21. The fifth fixed magnetic member 35 has a cuboid shape. The fifth fixed magnetic member 35 is made of, for example, a rare-earth magnet which, though small in size, generates a powerful magnetic coupling and is easy to process.

Figure 6:
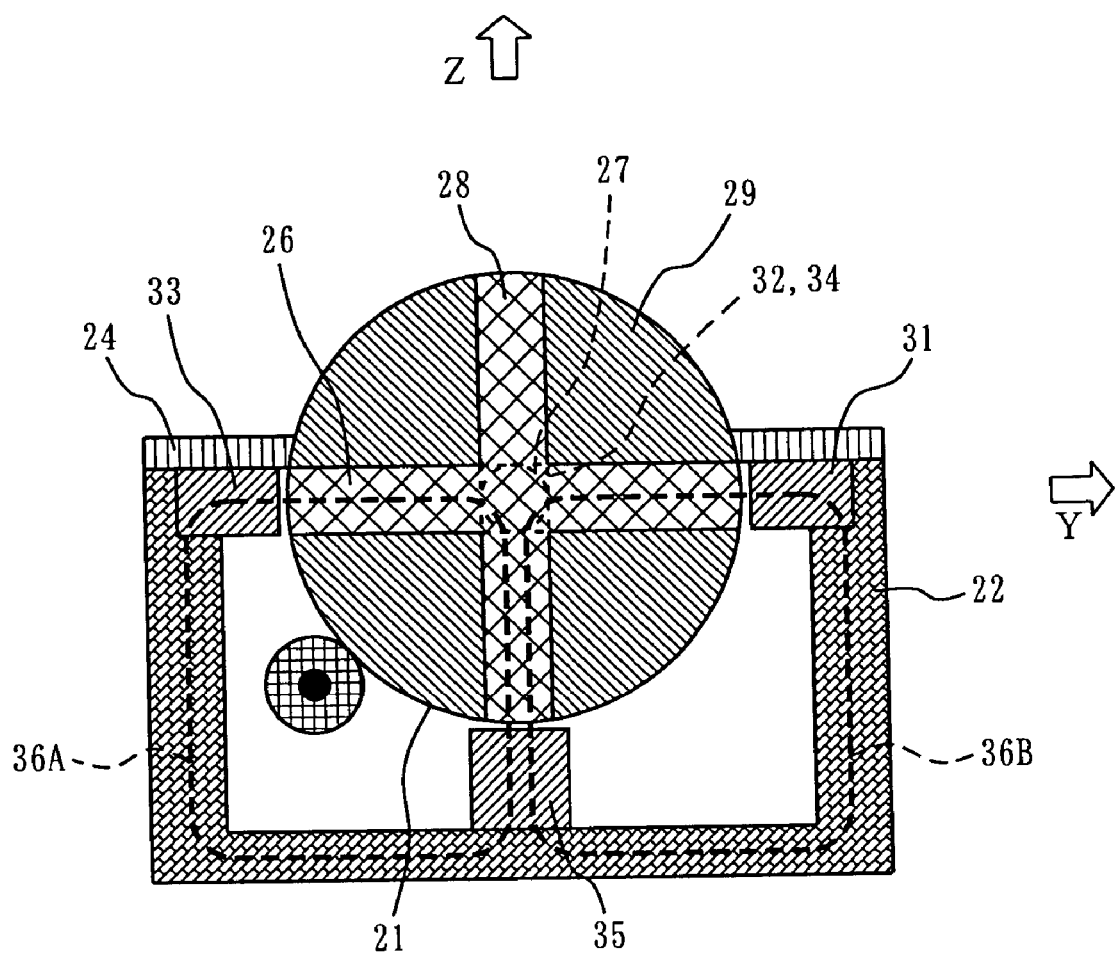
FIG. 6 is a diagram showing a magnetic flux generated by first to fifth fixed magnetic members 31 to 35 and a case 22.

The first to fourth fixed magnetic members 31 to 34 and the fifth fixed magnetic member 35 are fixed to the iron case 22. FIG. 6 is a diagram showing magnetic fluxes generated by the first to fifth fixed magnetic members 31 to 35 and the case 22. If the configuration is such as that of the trackball 2 according to first embodiment, a magnetic circuit such as magnetic fluxes 36A and 36B is established, as shown in FIG. 6. This further increases the magnetic attraction between the ends of the moving-magnet member and the first to fifth fixed magnetic members 31 to 35, and also inhibits the magnetic force from acting outside the case 22. Accordingly, it is possible to prevent magnetic dust, such as iron powder, from being adhered to the case 22 and to prevent devices, such as a watch worn by the user, from getting damaged.

Next, in the trackball 2 having a configuration such as the one described above, the position of the ball 21 in a normal state, i.e., in a state in which the user is not performing any operation, is described. Of the three bar members 26 to 28 embedded in the ball 21, both ends of two bar members present on the XY plane are strongly attracted to the first and third fixed magnetic members 31 and 33 and the second and fourth fixed magnetic members 32 and 34. One end of a bar member other than the above two bar members present on the Z axis is strongly attracted to the fifth fixed magnetic member 35. Thus, the ball 21 rests stably in a state in which the ball 21 is in the closest contact with the first to fifth fixed magnetic members 31 to 35.

Next, movement of the trackball 2 when rolling the ball 21 is described. First, it is assumed that the ball 21 is at rest in a position shown in FIGS. 3 and 4. That is, both ends 26A and 26B of the bar member 26 are respectively attracted to the first and third fixed magnetic members 31 and 33 by magnetic coupling. Both ends 27A and 27B of the bar member 27 are respectively attracted to the second and fourth fixed magnetic members 32 and 34 by magnetic coupling. One end 28B of the bar member 28 is attracted to the fifth fixed magnetic member 35 by magnetic coupling. Thus, the bar member 26 lies on the Y axis, the bar member 27 lies on the X axis, and the bar member 28 lies on the Z axis.

In such a state, if the user rotates the ball 21 in the forward direction of the Y axis (in the direction of the arrow Y, shown in FIGS. 2 and 3) by touching the upper portion of the ball 21 exposed from the round hole of the cover plate 24 with his hand or finger, a torque is applied to the ball 21 in the direction of the arrow Y. Accordingly, the ball 21 is rotated while causing the roller 40 (serving as a support portion) and the roller 42 to also rotate but sliding on the roller 41. The rotation axis of the ball 21 in this state is the central axis of the bar member 27, i.e., the axis that connects between the second fixed magnetic member 32 and the fourth fixed magnetic member 34. In this case, the ball 21 rotates against the attraction of the first and third fixed magnetic members 31 and 33 to both ends 26A and 26B of the bar member 26 and the attraction of the fifth fixed magnetic member 35 to one end 28B of the bar member 28.

Figure 7:
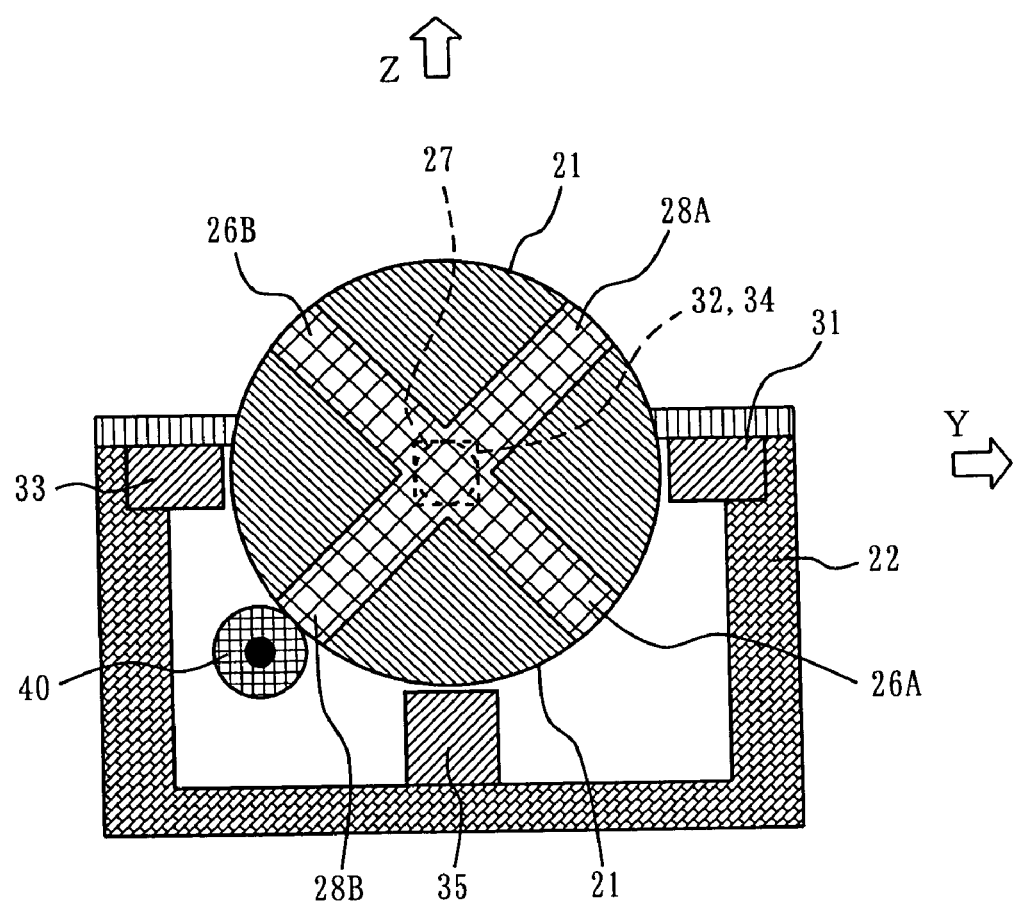
FIG. 7 is a diagram showing a state in which a ball 21 is in the process of rotating.

FIG. 7 is a diagram showing a state in which the ball 21 is in the process of rotating. When the rotation angle of the ball 21 is greater than about 45°, which is the mid-angle between the bar members 26 and 28, the force with which both ends 28A and 28B of the bar member 28 are attracted to the first and third fixed magnetic members 31 and 33 increases. In addition, the force with which the one end 26A of the bar member 26 is attracted to the fifth fixed magnetic member 35 increases. Accordingly, the ball 21 naturally rotates to a position of about 90° with respect to this rotation direction, and thus is poised at a stable position. If the user continues to apply torque to the upper portion of the ball 21, the ball 21 rotates in the same manner so as to be poised at a stable position every 90°. At this point, the user who manipulates the trackball 2 continuously perceives a resistance such that the rotation feels heavy or light every 90° rotation due to the attraction of the first and third fixed magnetic members 31 and 33 to the bar members 26 and 28, i.e., magnetic coupling, whereby the user experiences a crisp click with the hand or finger.

Also, in cases where the ball 21 is rotated in the direction opposite to the direction described above (the reversed direction of the Y axis) or where the ball 21 is rotated in either the forward or reversed direction of the X axis, the user experiences a crisp click every 90° rotation.

Even if the user applies a force to the ball 21 at an angle slightly deviated from the X or Y axis direction, the ball 21 rotates the forward or reversed direction of either the X or Y axis direction. This is due to a rotation direction limiting effect provided by the first to fourth fixed magnetic members 31 to 34. That is, in the case of rotating the ball 21 in the forward or reversed direction of either the X or Y axis, the ball 21 is rotated against the attraction of any two opposing fixed magnetic members among the first to fourth fixed magnetic members 31 to 34. On the other hand, in the case of rotating the ball 21 in directions other than the above-described directions, the ball 21 is rotated against all the attractions of the fixed magnetic members. Therefore, it is difficult to rotate the ball 21 in directions other than the forward and reversed directions of the X and Y axis directions. Accordingly, even if a force is applied to the ball 21 at a slightly deviated angle, the ball 21 rotates in the X or Y axis direction in which the ball is easily rotated.

Next, the effect of the fifth fixed magnetic member 35 is described. In order to rotate the ball 21, the user needs to rotate the ball 21 in the X or Y axis direction against the attractions exerted by the fixed magnetic members. For example, in the case of rotating the ball 21 in the forward direction of the Y axis, the contact force between the ball 21 and the roller 40 decreases, whereby the ball 21 is apt to approach the first fixed magnetic member 31.

On the assumption that the fifth fixed magnetic member 35 is absent, if the user applies a force to the ball 21 in the forward direction of the Y axis against the attraction of the first and third fixed magnetic members 31 and 33, the ball 21 is pulled away from the roller 40, and thus the distance between the ball 21 and the first fixed magnetic member 31 is reduced. Accordingly, while the attraction between the first fixed magnetic member 31 and the end 26A of the bar member 26 rapidly increases, the attraction between the third fixed magnetic member 33 and the end 26B of the bar member 26 rapidly decreases. Hence, the magnetic force applied to the ball 21 becomes unstable, whereby the rotation of the ball 21 becomes unstable.

On the other hand, when the fifth fixed magnetic member 35 is present as with the present embodiment, the contact force between the ball 21 and each of the rollers 40 to 42 increases by the attraction of the fifth fixed magnetic member 35. Therefore, even if the ball 21 is rotated in either the X or Y axis direction, it is possible to prevent the ball 21 from being pulled away from each roller, and consequently, the ball 21 approaches any of the first to fourth fixed magnetic members 31 to 34, thereby preventing the magnetic force applied to the ball 21 from becoming unstable. Hence, the rotation of the ball 21 becomes stable, and the user experiences the same crisp click regardless of whether the ball 21 is rotated in the X or Y axis direction. The present inventors have experimentally found that in order to stably rotate the ball 21, the magnetic force of the fifth fixed magnetic member 35 should be twice the magnetic force of each of the first to fourth fixed magnetic members 31 to 34.

Figure 8:
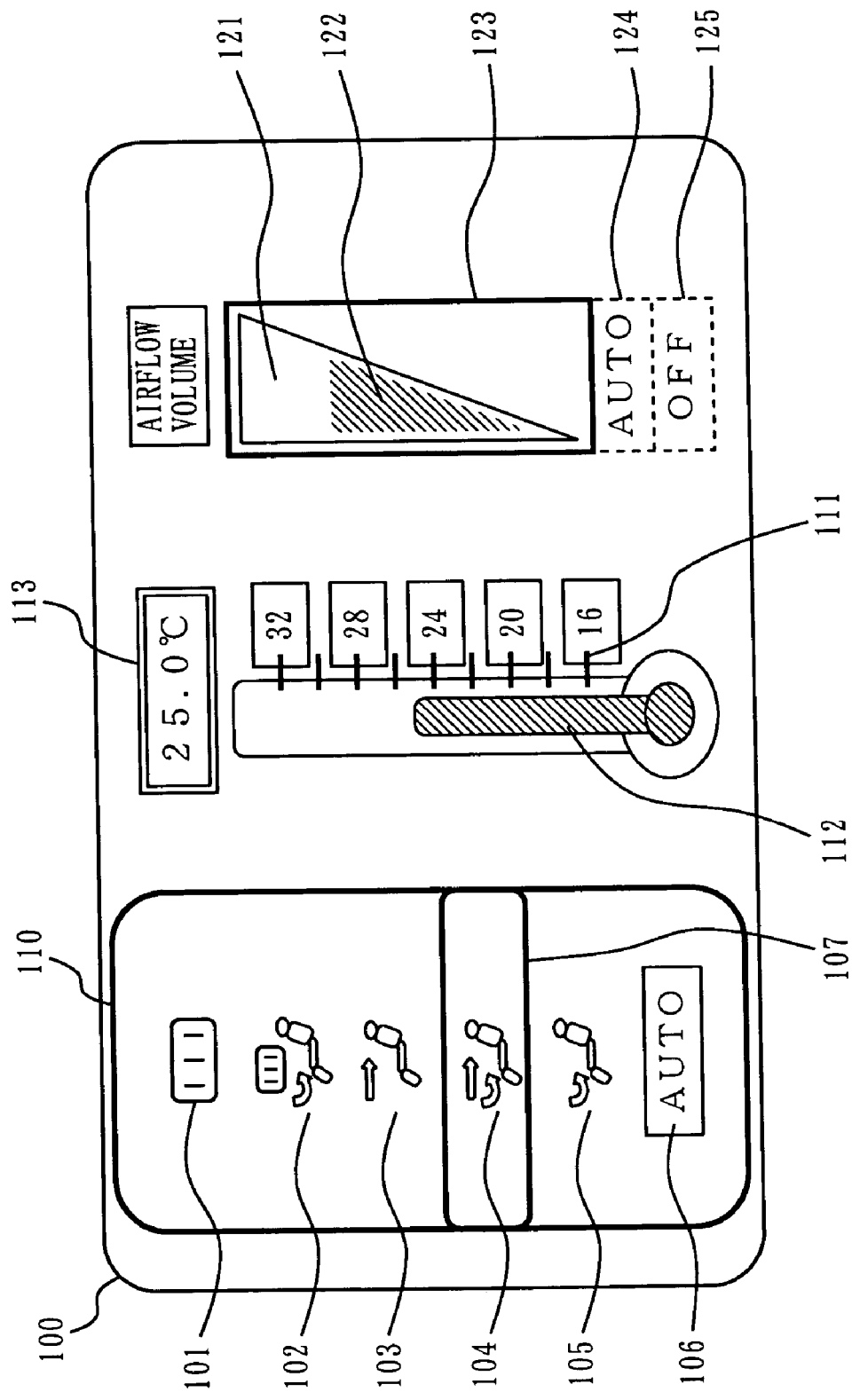
FIG. 8 is an illustrative diagram showing an application example of the in-vehicle device controller 1 having the trackball 2 mounted thereon.
Figure 9:
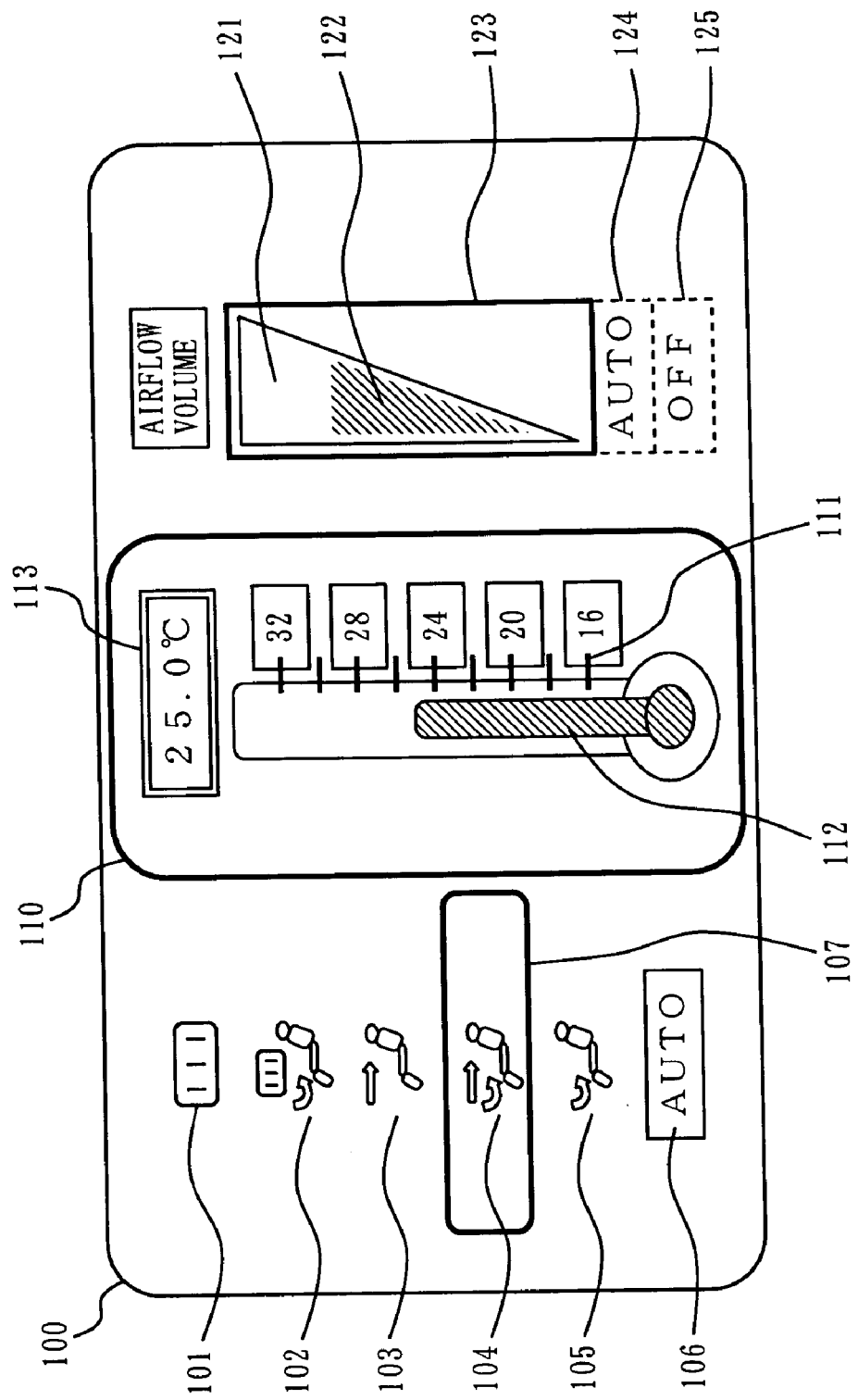
FIG. 9 is an illustrative diagram showing an application example of the in-vehicle device controller 1 having the trackball 2 mounted thereon.
Figure 10:
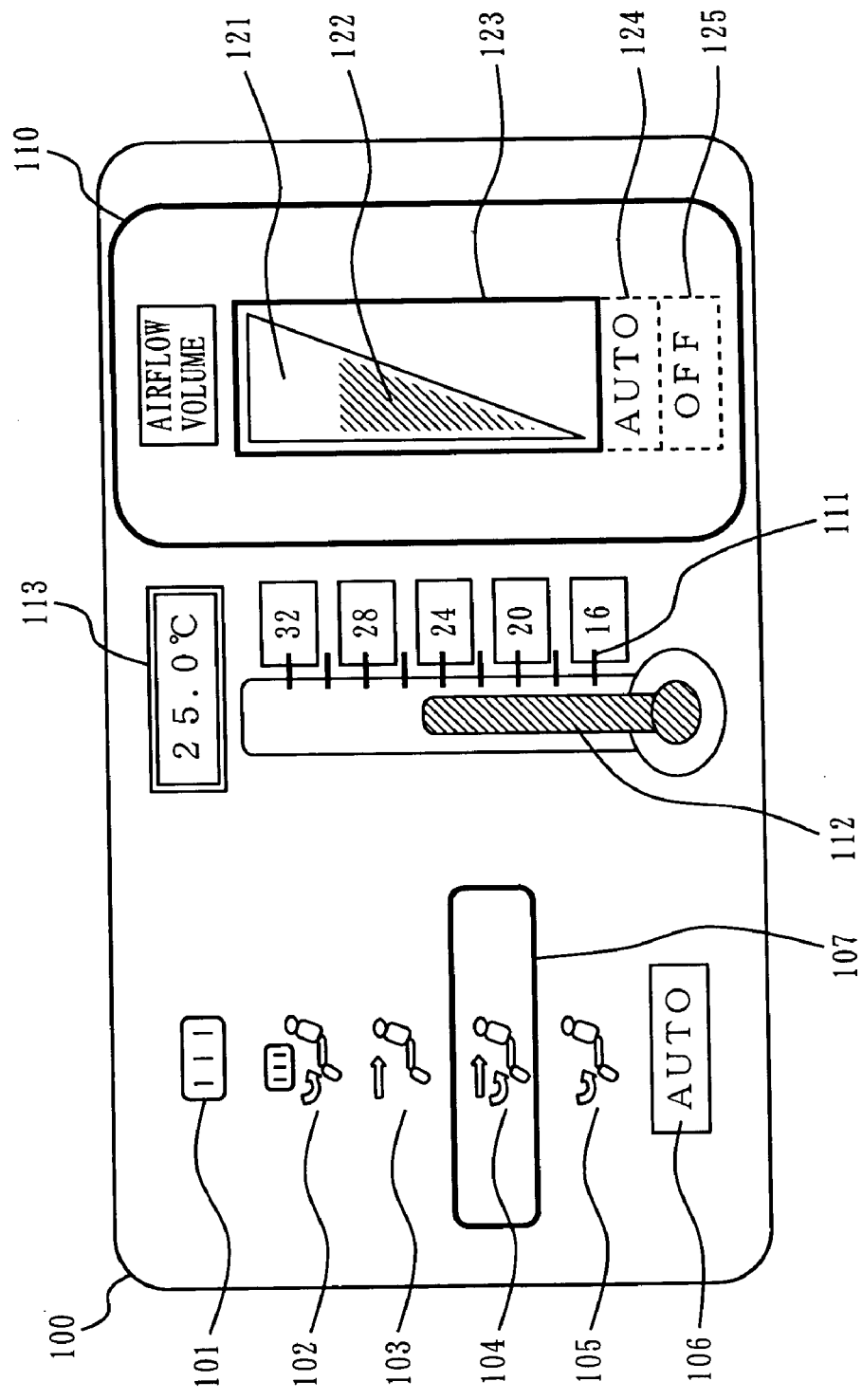
FIG. 10 is an illustrative diagram showing an application example of the in-vehicle device controller 1 having the trackball 2 mounted thereon.

FIGS. 8 to 10 are illustrative drawings showing application examples of the in-vehicle device controller 1 having the trackball 2 mounted thereon. With reference to FIGS. 8 to 10, application examples of the in-vehicle device controller 1 are described by using air-conditioning system settings as an example. In the present embodiment, it is assumed that an air-conditioning system, an audio system, a TV, a navigation system, and information are assigned, as control objects, to the buttons 4 to 8, respectively, but the control objects and order to be assigned to the buttons 4 to 8 are not limited to those described above.

In the case of air-conditioning system setting, the user presses the button 4 shown in FIG. 2 to select the air-conditioning system as a control object. When the button 4 is pressed, the in-vehicle device controller 1 allows the display 3 to display an exemplary display 100, such as those shown in FIGS. 8 to 10. In the setting of the air-conditioning system, the in-vehicle device controller 1 can adjust three settings, i.e., air outlet, temperature, and airflow volume, according to the users operation. The user can see which setting item the user can change, by the position of a setting item selection frame 110.

The exemplary display 100 in FIG. 8 shows a state in which the setting of an air outlet can be made. The exemplary display 100 in FIG. 9 shows a state in which the setting of temperature can be made. The exemplary display 100 in FIG. 10 shows a state in which the setting of airflow volume can be made.

When the button 4 is pressed, the in-vehicle device controller 1 allows the display 3 to display the setting item selection frame 110 at the position where the previous setting was made. The position of the setting item selection frame 110 can be changed by rotating the ball 21 by applying a force to the ball 21 in the forward or reversed direction of the X axis. To change from the setting of an air outlet shown in FIG. 8 to the setting of airflow volume shown in FIG. 10, the user rotates the ball 21 180° in the forward direction of the X axis. At this point, the user experiences a crisp click twice with, for example, the hand or finger. As described above, to select another setting item which is different from that currently selected by the setting item selection frame 110, the user rotates the ball 21 by applying a force in the direction in which the desired item is displayed. Thereby, the setting item can be changed. This operation method is sensory and natural for the user. Since the user feels a resistance every 90° rotation, it is possible to prevent the user from over-rotating the ball 21 and from rotating the ball 21 in the wrong direction. Thus, the user can securely change the position of the setting item selection frame 110 to two items away from the current position on the right, for example.

Next, the change of the settings for the three setting items is described. First, the setting of an air outlet is described, with reference to FIG. 8. Symbols 101 to 105 indicate the locations of the air outlet of the air-conditioning system in a vehicle. The user can change the location of the air outlet by selecting the symbols.

When the symbol 101 is selected, the in-vehicle device controller 1 controls the air-conditioning system to blow the air from the lower part of the windscreen (windshield) to prevent fogging of the windscreen. When the symbol 102 is selected, the in-vehicle device controller 1 controls the air-conditioning system to blow the air from the lower part of the windscreen to prevent the fogging of the windscreen, and a vent near the feet. When the symbol 103 is selected, the in-vehicle device controller 1 controls the air-conditioning system to blow the air from the upper portion of the instrument panel. When the symbol 104 is selected, the in-vehicle device controller 1 controls the air-conditioning system to blow the air from the upper portion of the instrument panel and a vent near the feet. When the symbol 105 is selected, the in-vehicle device controller 1 controls the air-conditioning system to blow the air from a vent near the feet. When the symbol 106 is selected, the in-vehicle device controller 1 controls the air-conditioning system to an automatic setting for blowing air from an appropriate air outlet(s).

An air outlet selection frame 107 encloses the symbol that is currently selected by the user. In the example shown in FIG. 8, the symbol 104 is selected. The air outlet setting can be changed only when the setting item selection frame 110 is at the position enclosing the symbols 101 to 106. FIG. 8 shows a state in which the setting of an air outlet can be changed. To change the air outlet, the user rotates the ball 21 in the forward or reversed direction of the Y axis. Each time the user rotates the ball 21 by 90° by applying a force in the forward direction of the Y axis (the forward direction of the vehicle), the user experiences a crisp click, and can select the air outlet in the order of the symbols 103, 102, and 101. In contrast, each time the user rotates the ball 21 by 90° by applying a force in the reversed direction of the Y axis (the backward direction of the vehicle), the user experiences a crisp click, and can select the air outlet in the order of the symbols 105 and 106. There are six options available for the air outlet selection. The user experiences a crisp click each time the user changes the symbol.

If the ball 21 is rotated in the forward direction of the Y axis in a state in which the symbol 101 is selected, the in-vehicle device controller 1 allows the selection of the symbol 106. On the other hand, if the ball 21 is rotated in the reversed direction of the Y axis in a state in which the symbol 106 is selected, the in-vehicle device controller 1 allows the selection of the symbol 101. As described above, the in-vehicle device controller 1 provides a user interface that allows the user to make a selection or change with a minimum operation.

The in-vehicle device controller 1 controls the air-conditioning system such that even if the user makes other settings or performs a functional control on other than the air-conditioning system, the selected air outlet is maintained until another setting is made to the air outlet.

Next, the setting of temperature is described, with reference to FIG. 9. The in-vehicle device controller 1 allows a set temperature display part 113 to display an in-vehicle temperature which is currently set, and allows a set temperature display bar 112 to display the currently set temperature against the temperature graduation. The set temperature can be changed only when the setting item selection frame 110 is at the position enclosing the set temperature display part 113, the set temperature display bar 112, and the temperature graduation. In a state in which the set temperature can be changed, the in-vehicle device controller 1 can change the set temperature of the air-conditioning system by rotating the ball 21 in the forward or reversed direction of the Y axis.

If the user rotates the ball 21 by applying a force to the ball 21 in the forward direction of the Y axis (the forward direction of the vehicle), the in-vehicle device controller 1 raises the set temperature. By contrast, if the user rotates the ball 21 by applying a force to the ball 21 in the reversed direction of the Y axis (the backward direction of the vehicle), the in-vehicle device controller 1 lowers the set temperature. The in-vehicle device controller 1 changes the set temperature display part 113 and the set temperature display bar 112 in accordance with the change of the set temperature.

The air-conditioning system of the present embodiment can change the set temperature in increments of 0.5° C. Therefore, the in-vehicle device controller 1 allows the 90° rotation of the ball 21 to correspond to the temperature of 0.5° C., and thus changes the set temperature of the air-conditioning system. Thereby, the user experiences a crisp click every 0.5° C. increment of change.

The temperature setting range in the air-conditioning system of the present embodiment is between 16° C. and 32° C. Thus, when the set temperature is 16° C., even if the user performs an operation to lower the temperature, the in-vehicle device controller 1 cannot change the set temperature. Similarly, when the set temperature is 32° C., even if the user performs an operation to raise the temperature, the in-vehicle device controller 1 cannot change the set temperature.

The in-vehicle device controller 1 does not change the temperature once it is set, even if the user makes other settings or performs a functional control on other than the air-conditioning system, until the user changes the set temperature.

Next, the setting of airflow volume is described, with reference to FIG. 10. The setting of airflow volume provides three modes. The first mode is a manual setting for manually setting the airflow volume freely. When the manual setting mode is selected, the in-vehicle device controller 1 increases the brightness of a manual airflow volume setting frame 123 on the display 3. The second mode is an automatic airflow volume setting in the air-conditioning system. When the automatic airflow volume setting mode is selected, the in-vehicle device controller 1 increases the brightness of an automatic airflow volume setting frame 124 on the display 3. The third mode is a no-airflow setting. When the no-airflow setting mode is selected, the in-vehicle device controller 1 increases the brightness of a no-airflow frame 125 on the display 3.

In the example shown in FIG. 10, the brightness of the manual airflow volume setting frame 123 is increased, indicating that the manual setting mode is selected. An airflow volume display bar 122 indicates the airflow volume set by the manual setting mode. The lower end of a set range 121 indicates that there is no airflow. The upper end of the set range 121 indicates the maximum airflow. The airflow volume can be changed only when the setting item selection frame 110 is at the position enclosing the manual airflow volume setting frame 123, the automatic airflow volume setting frame 124, and the no-airflow frame 125. In a state in which the airflow volume can be changed, when the ball 21 is rotated in the forward or reversed direction of the Y axis, the in-vehicle device controller 1 controls the air-conditioning system to change the airflow volume.

In the example shown in FIG. 10, the brightness of the manual airflow volume setting frame 123 is increased, indicating that the manual setting mode is selected. In this case, if the user rotates the ball 21 by applying a force to the ball 21 in the forward direction of the Y axis (the forward direction of the vehicle), the in-vehicle device controller 1 controls the air-conditioning system to increase the airflow volume. By contrast, if the user rotates the ball 21 by applying a force to the ball 21 in the reversed direction of the Y axis (the backward direction of the vehicle), the in-vehicle device controller 1 controls the air conditioning system to reduce the airflow volume. For the manual setting mode, the airflow volume can be adjusted in five levels from no airflow to the maximum airflow. Hence, in the manual setting mode where the brightness of the manual airflow volume setting frame 123 is increased, each time the user rotates the ball 21 by 90°, the in-vehicle device controller 1 changes the airflow volume by one level, along with an appropriate update of the airflow volume display bar 122.

In a state in which the airflow volume is at the maximum volume in the manual control, even if the user performs an operation to increase the airflow volume, the in-vehicle device controller 1 does not change the airflow volume. On the other hand, in a state in which there is no airflow in the manual control, if the user performs an operation to reduce the airflow volume, i.e., the user rotates the ball 21 by 90° in the reversed direction of the Y axis, the in-vehicle device controller 1 switches from the manual setting mode to the automatic airflow volume setting mode, and increases the brightness of the automatic airflow volume setting frame 124. If the user further rotates the ball 21 by 90° in the reversed direction of the Y axis, the in-vehicle device controller 1 switches from the automatic airflow volume setting mode to the no-airflow setting mode and increases the brightness of the no-airflow frame 125. Further, even if the ball 21 is rotated in the reversed direction of the Y axis in the no-airflow setting mode, the in-vehicle device controller 1 does not change the airflow volume.

On the other hand, in the no-airflow setting mode, if the user rotates the ball 21 by 90° by applying a force to the ball 21 in the forward direction of the Y axis (the forward direction of the vehicle), the in-vehicle device controller 1 switches from the no-airflow setting mode to the automatic airflow volume setting mode and increases the brightness of the automatic airflow volume setting frame 124. If the user further rotates the ball 21 by 90° by applying a force to the ball 21 in the forward direction of the Y axis (the forward direction of the vehicle), the in-vehicle device controller 1 switches from the automatic airflow volume setting mode to the manual setting mode and increases the brightness of the manual airflow volume setting frame 123.

As described above, in the first embodiment, a fixed magnetic member is provided beneath the ball so that the force to attract the ball acts at all times, whereby a stable operational feel can be provided to the user. In addition, since the in-vehicle device controller allows the screen provided on the display and the movement of the trackball to correspond to each other, an interface for intuitively controlling in-vehicle devices can be provided.

In the above embodiment, the ball has three bar members embedded therein on three axes. Alternatively, in order to provide a crisp click to the rotation only in one direction (for example, the Y direction), the ball would only need to have two unmagnetized bar members embedded therein on at least two axes orthogonal to each other. In this case, a crisp click is provided by magnetic coupling between the magnets fixed to side surfaces of the case and the magnetic members embedded in the ball. In addition, because the magnet fixed to the bottom surface of the case attracts the magnetic members embedded in the ball, a stable operational feel can be provided to the user.

Moreover, in the above embodiment, the ball has bar members embedded therein, but the structure is not limited thereto as long as the ball is formed in a manner such that eight surfaces of the ball orthogonal to the X, Y, and Z axes are made of magnetic members. For example, the eight surfaces may have embedded therein cylindrical or polygonal columns, wedge-shaped magnetic members, or spherical members. In addition, other shapes may be employed. That is, the ball should have embedded therein at least one magnetic member so as to be magnetically coupleable in directions of first, second, and third axes intersecting with one another at the center of the ball and orthogonal to one another. The same applies to the case where magnetic members are embedded in the ball on at least two axes. That is, the ball should have embedded therein at least one magnetic member so as to be magnetically coupleable in directions of first and second axes intersecting with one another at the center of the ball and orthogonal to one another.

In the above embodiment, the bar members are embedded in the ball on the X, Y, and Z axes, but the configuration is not limited thereto. That is, bar members may be embedded at predetermined positions so as not to be orthogonal to each other. In this case, because the ball is stably poised at a predetermined position, the user experiences a crisp click every predetermined angle.

The above-described first to fifth fixed magnetic members may be permanent magnets or electromagnets, or any type of magnet can be used as long as the member is magnetizable.

In the process of making a setting, if any of the buttons 4 to 8 for selecting a control object is pressed, the in-vehicle device controller 1 allows the display 3 to display a control screen for the selected object, allowing the user to control the selected object.

In the above embodiment, the trackball of the present invention is applied to a vehicle, but the application is not limited thereto. For example, the trackball of the present invention can be applied to various electronic devices, such as air-conditioners, audio systems, TV remote controllers, telephones, and mobile phones. The application range is very wide.

Second Embodiment

Figure 11:
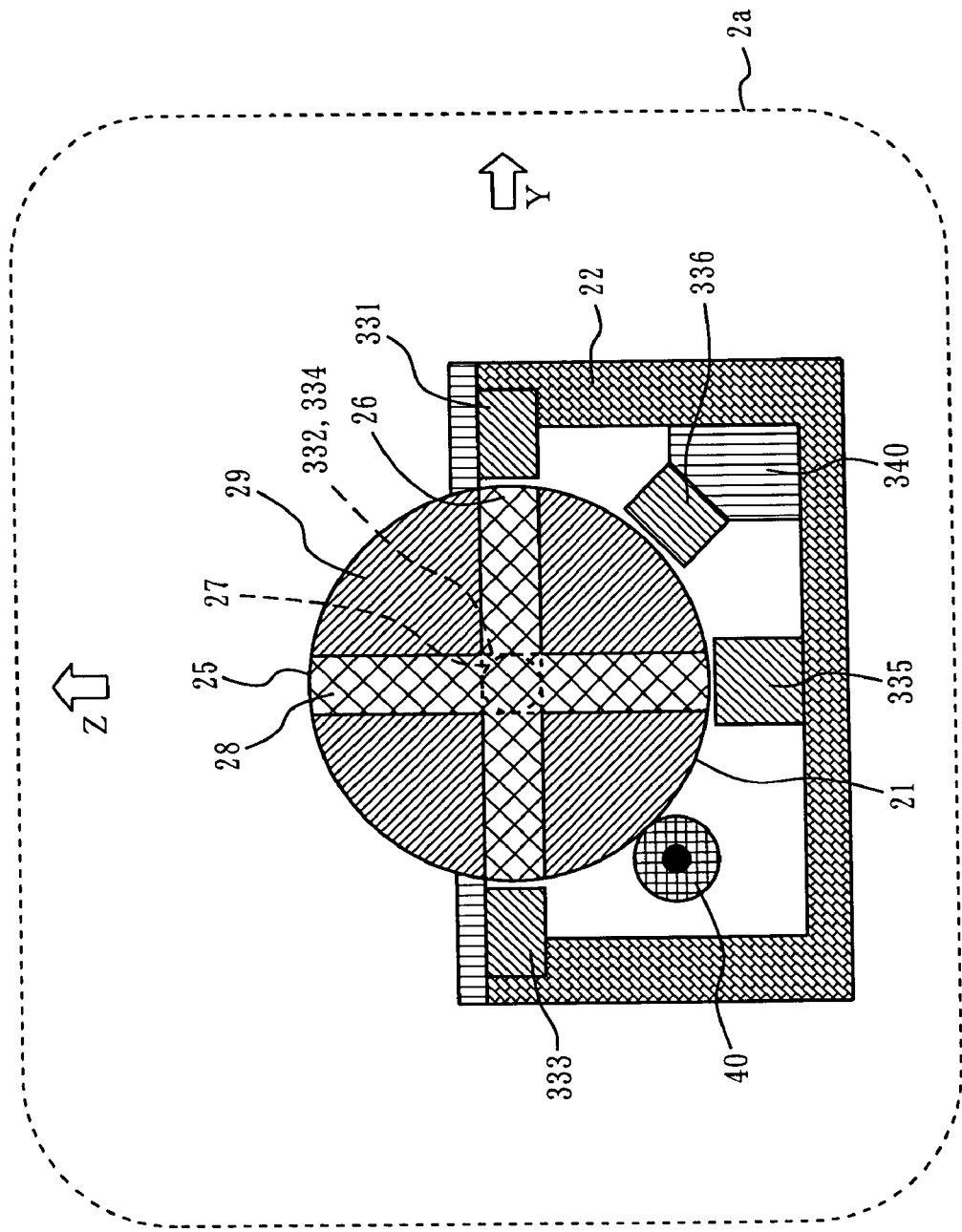
FIG. 11 is a cross-sectional view of a trackball 2a according to a second embodiment of the present invention.

FIG. 11 is a cross-sectional view showing a trackball 2*a* according to a second embodiment of the present invention. FIG. 11 is equivalent to FIG. 3 in the first embodiment. In FIG. 11, the components similar to those found in the first embodiment are designated by like reference numerals and the descriptions thereof are omitted. In addition, the relationship between an in-vehicle device controller 1 and in-vehicle devices 11 is the same as that described in the first embodiment and thus FIG. 2 is incorporated in the present embodiment.

The trackball 2*a* includes a ball 21, a case 22, first to fourth fixed electromagnets 331, 332, 333, and 334, a fifth fixed electromagnet 335, a sixth fixed electromagnet 336, an electromagnet controller 340, rollers 40, 41, and 42, shafts 43, 44, and 45, shaft bearings 46A, 46B, 47A, 47B, 48A, and 48B, and rotary encoders 50 and 51. The rollers 41 and 42, the shafts 43 to 45, the shaft bearings 46A to 48B, and the rotary encoders 50 and 51 are the same as those in the first embodiment and thus are omitted in FIG. 11.

Figure 12:
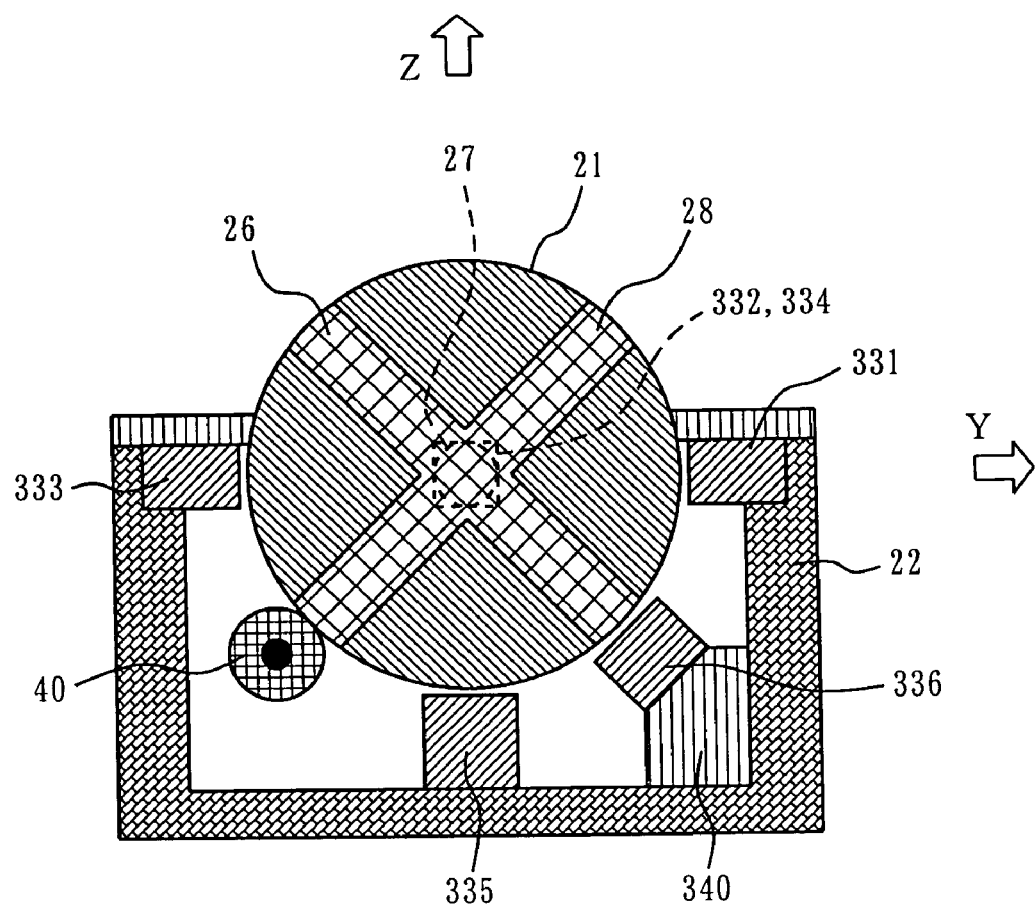
FIG. 12 shows a state in which a ball 21 is rotated 45° from the position shown in FIG. 11 with the central axis of a bar member 27, i.e., the axis formed between fixed magnetic members 32 and 34, as the rotation axis.

In the second embodiment, the first to fourth fixed magnetic members 31 to 34 in the first embodiment are replaced with the first to fourth fixed electromagnets 331 to 334, and the fifth fixed magnetic member 35 in the first embodiment is replaced with the fifth fixed electromagnet 335. In addition, the sixth fixed electromagnet 336 is additionally provided in the second embodiment. FIG. 12 shows a state in which the ball 21 is rotated 45° from the position shown in FIG. 11 with the central axis of a bar member 27, i.e., the axis connecting between fixed the magnetic members 332 and 334, as the rotation axis. The sixth fixed electromagnet 336 is arranged so as to be, when the ball 21 is rotated in a state as shown in FIG. 12, at a position which is on the extension of either a bar member 26 or 28.

The electromagnet controller 340 changes the state of either the presence or absence of the magnetic force of the first to sixth fixed electromagnets 331 to 336, and the magnetic force strength of the first to sixth fixed electromagnets 331 to 336, according to a mode signal concerning a menu which is sent from the in-vehicle device 11 via the in-vehicle device controller 1.

If the electromagnet controller 340 controls the electromagnets such that the first to fourth and the sixth fixed electromagnets 331 to 334 and 336 all have the same magnetic force and the fifth fixed electromagnet 335 has a magnetic force twice the magnetic force of the first to fourth and the sixth fixed electromagnets 331 to 334 and 336 and has a polarity opposite to the polarity of the first to fourth and the sixth fixed electromagnets 331 to 334 and 336, the ball 21 can stably be poised even in a state shown in FIG. 12. Thus, the user experiences a crisp click every 45° at the time of rotating the ball 21. When a crisp click of 45° is required, the in-vehicle device 11 sends to the in-vehicle device controller 1 a mode signal to obtain such magnetic forces.

If the electromagnet controller 340 controls the electromagnets such that the first to fourth fixed electromagnets 331 to 334 all have the same magnetic force and the fifth fixed electromagnet 335 has a magnetic force twice the magnetic force of the first to fourth fixed electromagnets 331 to 334 and has a polarity opposite to the polarity of the first to fourth fixed electromagnets 331 to 334, the ball 21 can stably be poised, as in the first embodiment, in a state shown in FIG. 11, and thus the user experiences a crisp click every 90° at the time of rotating the ball 21. When a crisp click is required every 90°, the in-vehicle device 11 sends to the in-vehicle device controller 1 a mode signal to obtain such magnetic forces.

Next, with reference to FIGS. 8 to 10, an application example of the in-vehicle device controller 1 according to the second embodiment is described by using an air-conditioning system setting as an example. As in the first embodiment, when the button 4 shown in FIG. 2 is pressed, the in-vehicle device controller 1 allows the display 3 to display an exemplary display 100, such as those shown in FIGS. 8 to 10.

In the case of controlling the air-conditioning system, the in-vehicle device controller 1 determines, according to a mode signal sent from the air-conditioning system, whether or not to generate the magnetic force of the sixth fixed electromagnet 336, and controls the electromagnet controller 340.

For the air-conditioning system, the user can make settings of an air outlet, temperature, and airflow volume. The user can see which setting item the user can change, by the position of the setting item selection frame 110. The position of the setting item selection frame 110 can be changed by rotating the ball 21 by applying a force to the ball 21 in the forward or reversed direction of the X axis, as in the first embodiment.

First, the setting of the air outlet is described. When the setting of air outlet is selected, the in-vehicle device controller 1 controls the electromagnet controller 340 in a manner such that only the first to fifth fixed electromagnets 331 to 335 generate a magnetic force and the sixth fixed electromagnet 336 does not generate a magnetic force. Thus, the user can make the setting of air outlet in the same manner as that of the first embodiment.

Next, the setting of temperature is described, with reference to FIG. 9. When the temperature setting is selected, the in-vehicle device controller 1 controls the electromagnet controller 340 in a manner such that all of the first to sixth fixed electromagnets 331 to 336 generate a magnetic force. The in-vehicle device controller 1 controls the air-conditioning system such that each time the ball 21 is rotated 45° in the forward or reversed direction of the Y axis the temperature changes in increments of 0.5° C. The operation is the same as that of the first embodiment, except that the user experiences a crisp click every 45° rotation.

The temperature setting is not one where one option is selected from just a few options, like the air outlet setting, but is one where a value for the temperature is adjusted gradually in small increments. Thus, the number of levels for the selection is greater than that for the air outlet setting, and therefore it is preferable that the rotation angle of the ball 21 required for one level adjustment be small. Hence, it is advantageous that the in-vehicle device controller 1 controls the temperature setting such that the set temperature changes in increments of 0.5° C. every 45° of rotation.

Next, the setting of airflow volume is described, with reference to FIG. 10. In the airflow volume setting mode, when the manual airflow volume setting mode is selected, the in-vehicle device controller 1 controls the electromagnet controller 340 in a manner such that all of the first to sixth fixed electromagnets 331 to 336 generate a magnetic force. When the automatic airflow volume setting mode is selected, the in-vehicle device controller 1 controls the electromagnet controller 340 in a manner such that only the first to fifth fixed electromagnets 331 to 335 generate a magnetic force. When the no-airflow setting mode is selected, the in-vehicle device controller 1 controls the electromagnet controller 340 in a manner such that only the first to fifth fixed electromagnets 331 to 335 generate a magnetic force.

When the manual airflow volume setting mode is selected, because the magnetic force is generated by all of the first to sixth fixed electromagnets 331 to 336, the in-vehicle device controller 1 controls the air-conditioning system in a manner such that the airflow volume changes by one level each time the ball 21 is rotated 45°. In the manual airflow volume setting mode, when the airflow volume is at minimum volume, if the ball 21 is rotated 45°, the in-vehicle device controller 1 controls the air-conditioning system to be the automatic airflow volume setting mode and also controls the electromagnet controller 340 so that the sixth fixed electromagnet 336 does not generate a magnetic force. On the other hand, in the automatic airflow volume setting mode, if the ball 21 is rotated 90° in the forward direction of the Y axis, the in-vehicle device controller 1 controls the air-conditioning system to be the manual airflow volume setting mode and also controls the electromagnet controller 340 so that the sixth fixed electromagnet 336 generates a magnetic force. Except for these, the control is the same as that of the first embodiment.

As described above, in the second embodiment, by controlling the magnetic force of the fixed electromagnets, the frequency of the crisp click can be adjusted, depending on which parameter of a given in-vehicle device is to be controlled.

In the above second embodiment, fixed electromagnets are used, but if the purpose is only to provide a crisp click every 45° rotation, the trackball may be configured by using only fixed magnetic members.

In addition, the configuration may be such that only the sixth fixed electromagnet is an electromagnet and the first to fifth fixed electromagnets are replaced with permanent magnets.

In the case of using fixed magnetic members, the presence or absence of the magnetic force of the fixed magnetic members may be switched by a motor or solenoid by providing a mechanical system, such as a boulder mount used in optical experiments, in which the magnetic force does not act on the moving-magnet member 25 of the ball 21. Thus, even if fixed magnetic members are used, it is possible to switch between a crisp click every 90° rotation and a crisp click every 45° rotation.

By controlling fixed electromagnets so as not to generate a magnetic force, a trackball that does not provide a crisp click can also be provided. Thus, by the combination of fixed electromagnets generating a magnetic force and fixed electromagnets not generating a magnetic force, a wide variety of applications can be offered; for example, an ability to scroll on the map in a navigation system without a crisp click could also be provided.

Figure 13:
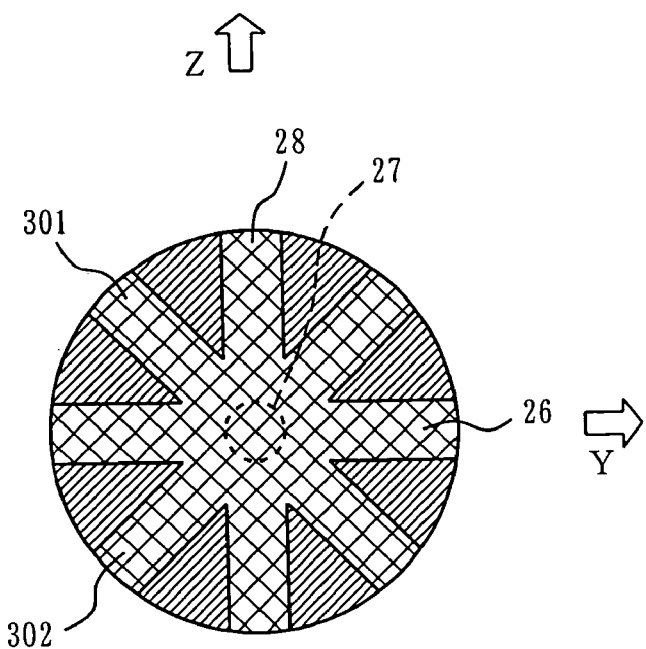
FIG. 13 is a cross-sectional view of a ball 21 taken along a YZ plane.

In order to provide a crisp click each time the ball is rotated 45°, instead of providing the sixth fixed electromagnet, a moving-magnet member embedded in the ball may be configured in the manner described in FIG. 13. FIG. 13 is a cross-sectional view of the ball 21 taken along the YZ plane. Bar members 301 and 302 are orthogonal to a bar member 27 and constitute an angle of 45° with respect to each of bar members 26 and 28, and are arranged such that the central axes thereof penetrate through the center of the ball. Thereby, even without the sixth fixed electromagnet, when the bar member 27 is the central axis, a crisp click every 45° rotation can be provided to the user.

Figure 14:
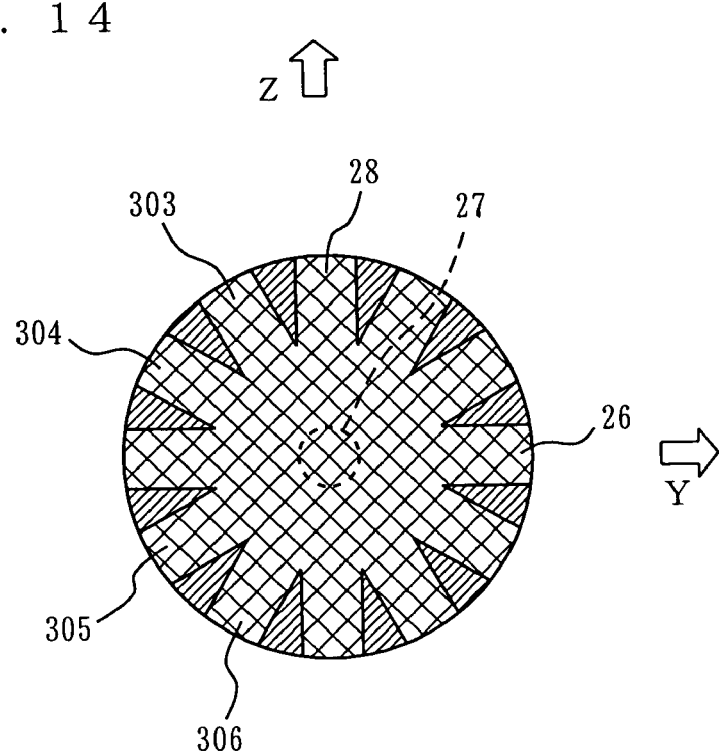
FIG. 14 is a diagram showing another configuration example of the ball.

In addition, as shown in FIG. 14, bar members 303, 304, 305, and 306 may be orthogonal to a bar member 27 and may make an angle of 30° or 60° with respect to either of bar members 26 and 28, and may be arranged such that the central axes thereof penetrate through the center of the ball. Thereby, when the bar member 27 is the central axis, a crisp click every 30° rotation can be provided to the user.

Needless to say, by embedding a larger number of bar members (preferably, an even number of bar members) in the ball, it becomes possible to provide crisp clicks at a finer resolution.

Third Embodiment

Figure 15:
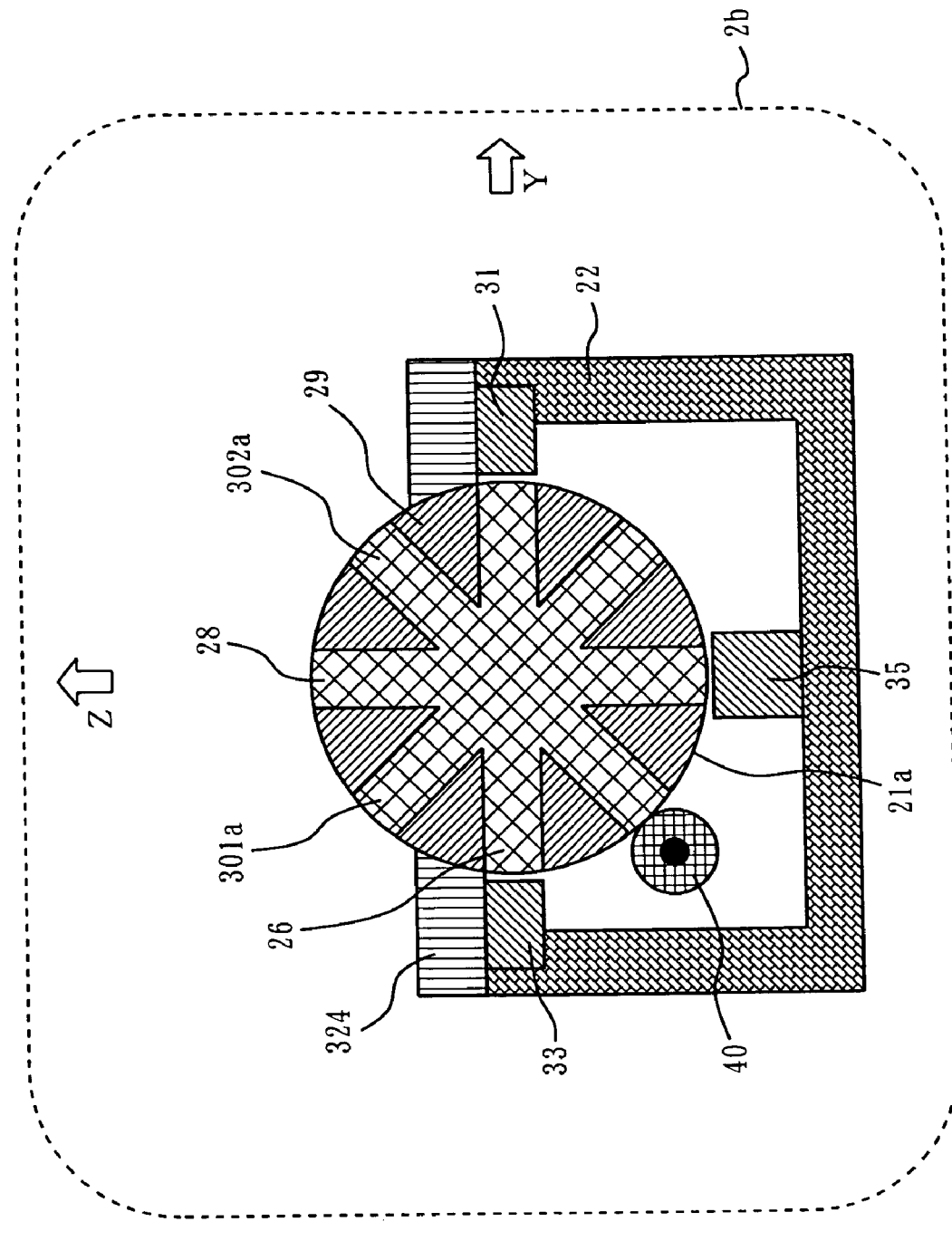
FIG. 15 is a cross-sectional view of a trackball 2b taken along a YZ plane, according to a third embodiment of the present invention.
Figure 16:
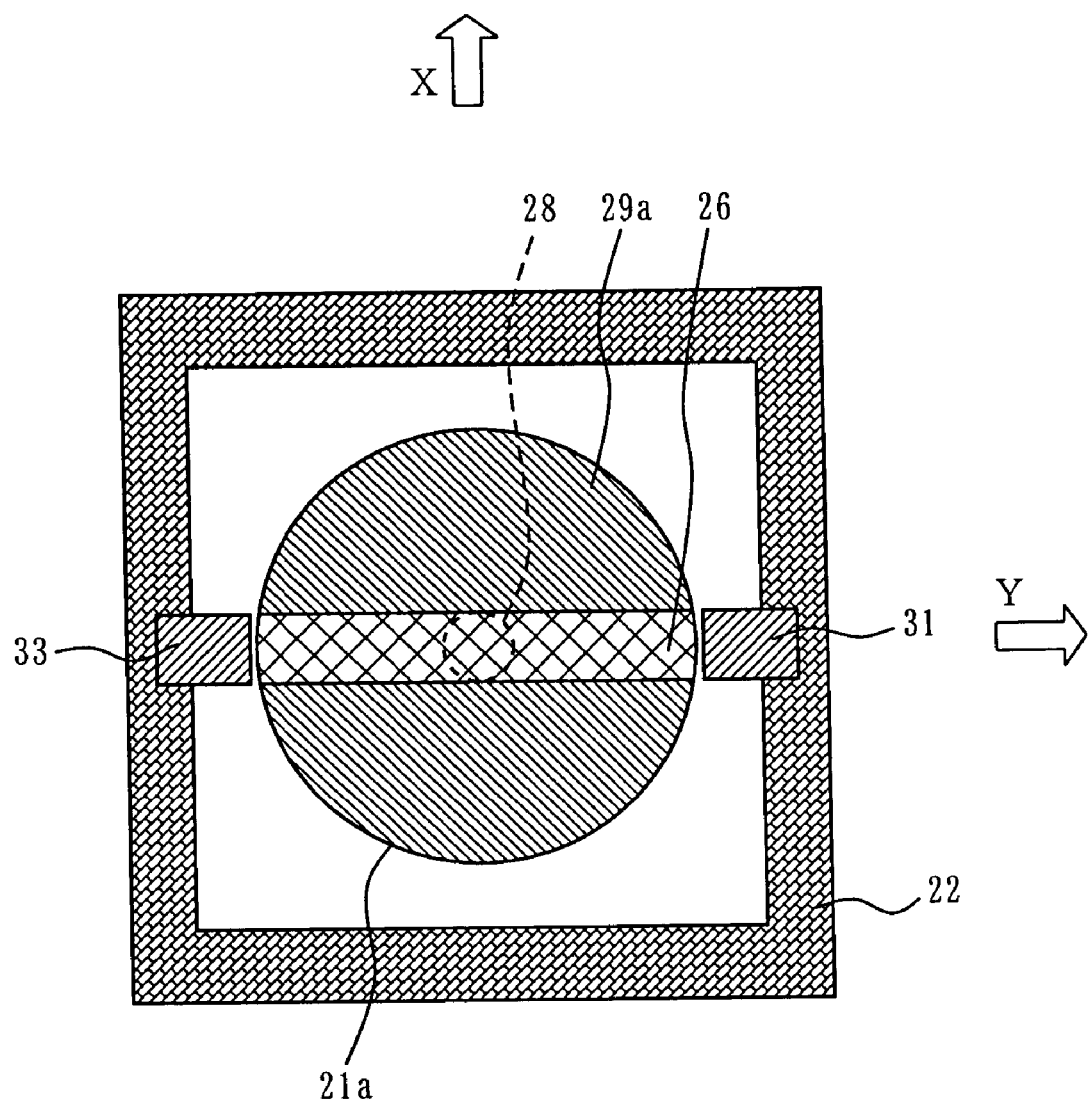
FIG. 16 is a cross-sectional view of the trackball 2b taken along an XY plane, according to the third embodiment of the present invention.
Figure 17:
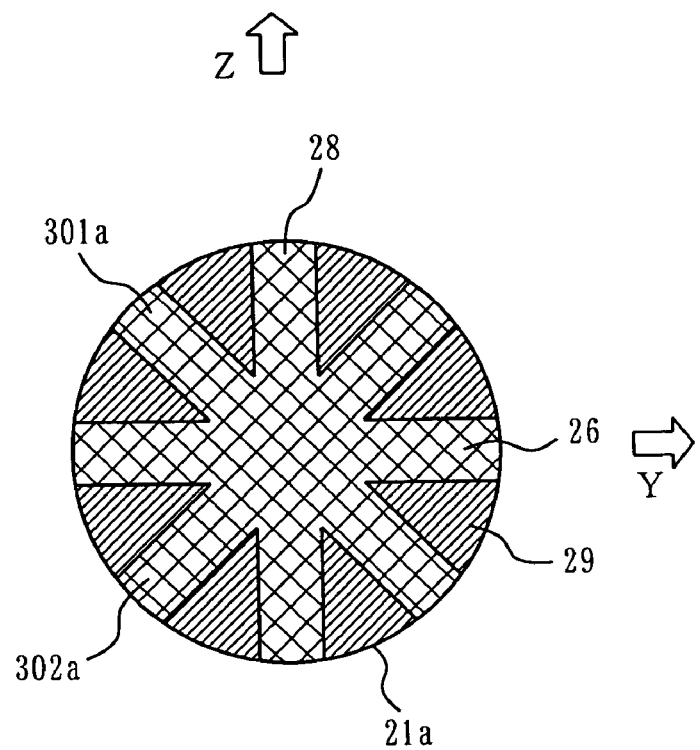
FIG. 17 is a cross-sectional view of a ball 21a taken along the YZ plane.

FIG. 15 is a cross-sectional view of a trackball 2b taken along a YZ plane according to a third embodiment of the present invention. FIG. 15 is a cross-sectional view equivalent to that of FIG. 3 in the first embodiment. FIG. 16 is a cross-sectional view equivalent to that of FIG. 4 in the first embodiment. FIG. 17 is a cross-sectional view of a ball 21a taken along a YZ plane. In FIGS. 15 to 17, the components similar to those found in the first embodiment are designated by like reference numerals and the descriptions thereof are omitted.

The trackball 2b according to the third embodiment is configured in the same manner as that of the first embodiment, except for eliminating the second and forth fixed magnetic members 32 and 34 and one bar member (the bar member 27 in FIG. 16) among the three bar members on three axes orthogonal to each other.

As shown in FIG. 15, the ball 21a according to the third embodiment has embedded therein four bar members 26, 28, 301a, and 302a on the YZ plane. The four bar members 26, 28, 301a, and 302a intersect with one another at the center of the ball 21a and are embedded in the ball such that the angles between adjacent bar members are equal to each other. Both ends of each bar member reach the surface of the ball 21a or the vicinity of the surface of the ball 21a.

First and third fixed magnetic members 31 and 33 are magnetically coupled to ends of a bar member so that the ball 21a rotates around the central axis of the bar member (in FIG. 15, the central axis of the bar member 26) penetrating through the center of the ball 21a. A fifth fixed magnetic member 35 is magnetically coupled to an end of the bar member 28.

A cover plate 324 for covering the top surface of a case 22 has an opening portion for exposing the upper portion of the ball 21a. The upper portion of the ball 21a exposed from the cover plate 324 restricts a portion that can be touched with a hand or finger. Specifically, the ball 21a is exposed from the cover plate 324 so that the ball 21a rotates about a quarter of the diameter of the ball 21a, i.e., 45° which is the angle between the plurality of bar members. The attraction of the fifth fixed magnetic member 35 has a strength such that the attraction acts on the range of 45° in all directions a round any bar member situated so as to extend along the Z axis direction.

When the user rotates the ball 21a by applying a force to the ball 21a in the X axis direction, the ball 21a moves around the bar member 26. However, by the attraction of the fifth fixed magnetic member 35, the force to return to the original states acts on the ball 21a. Thus, when the user releases the hand or finger from the ball 21a, the ball 21a rotates in the direction opposite to the direction in which the operation in the X axis direction is performed due to the attraction of the fifth fixed magnetic member 35, and is stabilized at the time when the bar member 28 lies on the fifth fixed magnetic member 35. Thus, in the third embodiment, the ball 21a cannot be rotated in the X axis direction.

As described above, in the third embodiment, since the ball 21a cannot rotate in the X axis direction and returns to the original position, the feeling of manipulating a joy stick can be provided to the user. In addition, because the bar members 26, 28, 301a, and 302b are arranged with a 45° angle between the bar members, when the ball is rotated in the Y axis direction, the user experiences a crisp click every 45° rotation. Thus, the operational feel can be made to be different between the X axis direction and the Y axis direction, and therefore it is advantageous to prevent, for example, misoperation.

When using a trackball according to the third embodiment, an in-vehicle device controller may control an in-vehicle device such that when the ball is rotated greater than a predetermined angle (e.g., 30°) in the X direction, this operation is regarded as an operation in the X direction. In this case, in the operation in the X axis direction, the ball returns to the original position each time an operation is performed, such as a joy stick, and therefore it is advantageous in the case of making a selection for a menu with a few options. On the other hand, in the operation in the Y axis direction, a rotation operation with a crisp click can be performed, and thus it is advantageous in the case of making a selection for a menu with many options or setting a value.

Figure 18:
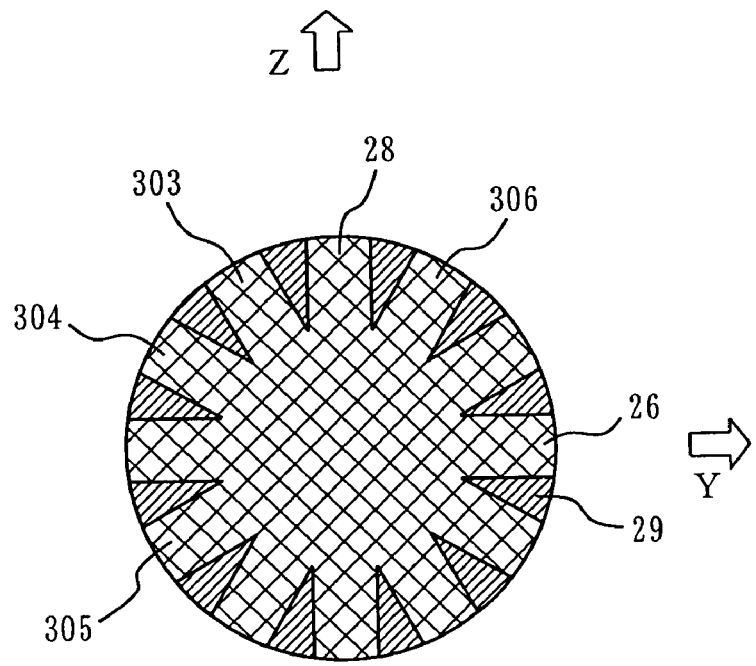
FIG. 18 is a diagram showing another configuration example of the ball.

It is also possible to arrange a plurality of bar members 26, 28, 303, 304, 305, and 306 such that the angles between the bar members have the same measure, as shown in FIG. 18. This provides the user a crisp click each time the ball rotates 30°. The number of bar members is preferably an even number.

It is not necessary for the cover plate 324 covering the top surface of the case 2 to have a round hole made in a flat plate. That is, the rotatable angle by one operation with a hand may be made different between the X and Y directions. It is preferable that the Y-direction rotatable angle be set to a value greater than that of the X-direction rotatable angle, by, for example, making a large oval hole in the cover plate 324 in the Y direction.

The first, third, and fifth fixed magnetic members 31, 33, and 35 may be a unit that is capable of switching between the presence and absence of the magnetic force of, for example, electromagnets. In this case, by eliminating the magnetic force of electromagnets, a trackball in which the ball 21a freely rotates can be provided.

Fourth Embodiment

Figure 19:
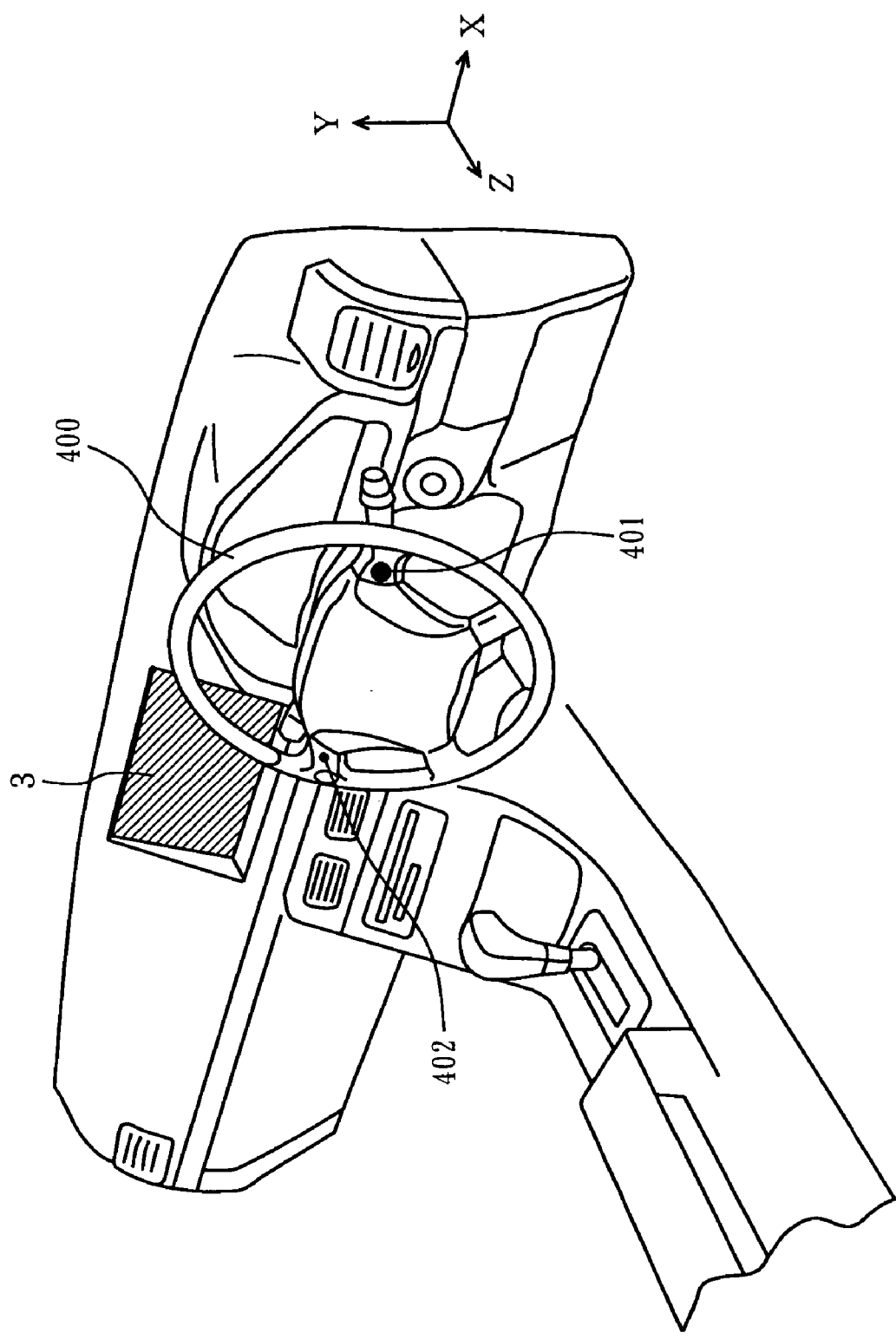
FIG. 19 is an external perspective diagram showing a cockpit of a vehicle equipped with a trackball 401 according to a fourth embodiment of the present invention.
Figure 20:
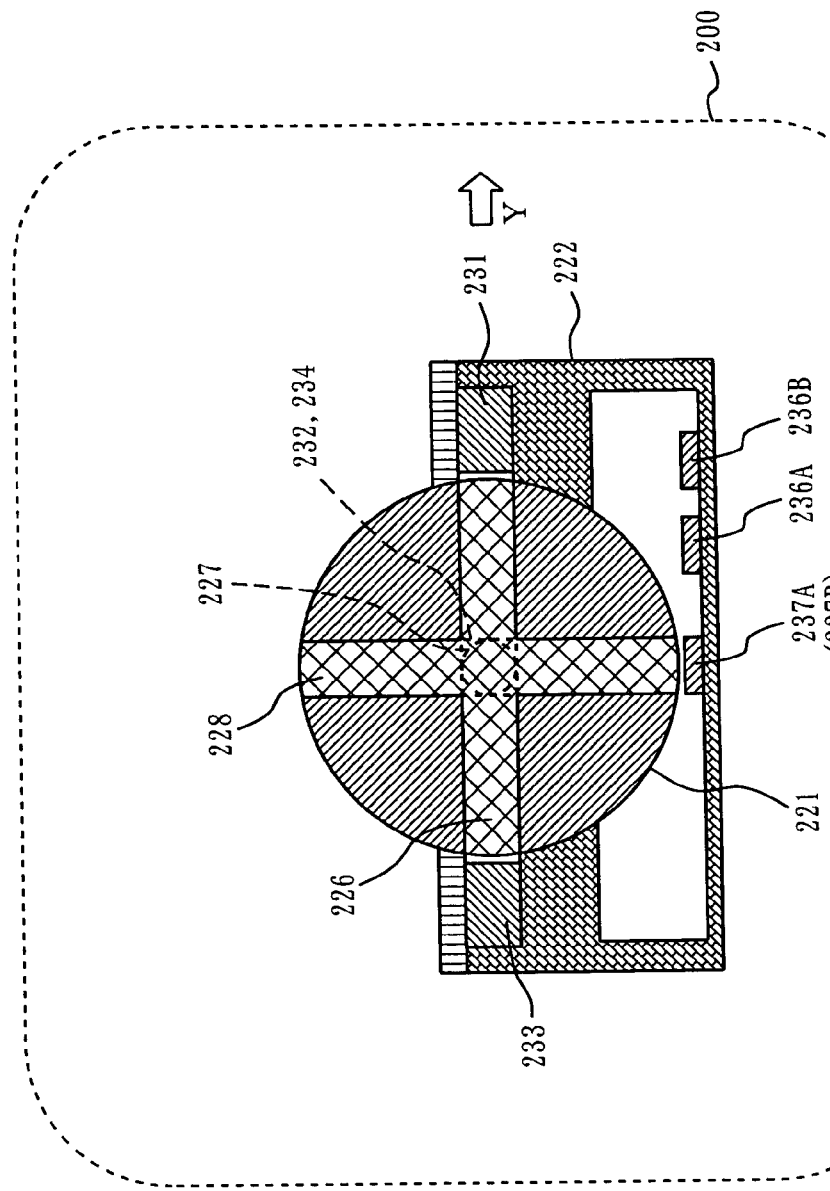
FIG. 20 is a cross-sectional view of a conventional trackball 200 that provides a crisp click.

FIG. 19 is an external perspective diagram showing a cockpit of a vehicle equipped with a trackball 401 according to a fourth embodiment of the present invention. In FIG. 19, a steering wheel 400 is provided with the trackball 401 and a button 402. The trackball 401 and the button 402 comprise an in-vehicle device controller according to the fourth embodiment.

The trackball 401 is a device used for controlling in-vehicle devices which are control objects, and is mounted on a spoke portion of the steering wheel. The trackball 401 is provided at a location where an operation is easily performed by the thumb. In FIG. 19, the trackball 401 is provided at a location where an operation is easily performed by the thumb of the right hand, but the location of the trackball 401 is not limited thereto.

The button 402 is provided to select any number of in-vehicle devices to be controlled, and is mounted on a spoke portion of the steering wheel. The button 402 is provided at a location where an operation is easily performed by the thumb. In FIG. 19, the button 402 is provided at a location where an operation is easily performed by the thumb of the left hand, but the location of the button 402 is not limited thereto.

As in the first embodiment, a display 3 displays a menu screen for controlling an in-vehicle device, according to instructions from the in-vehicle device controller.

The structure of the trackball 401 is the same as that described in the first embodiment. Therefore, FIGS. 3 to 5 are incorporated in the present embodiment. It is to be noted, however, that in the fourth embodiment the trackball 401 is arranged such that the XY plane is a plane made by the steering wheel 400. In FIG. 19, X, Y, and Z axes are shown for clarity. As in FIG. 1, the center of the X, Y, and Z axes lies at the center of a ball included in the trackball 401.

When the driver is not touching the ball 21, a fifth fixed magnetic member 35 attracts the ball 21. Thus, as shown in FIG. 3, the ball 21 is at rest with close contact with a roller 40.

Next, the operation method of the trackball 401 is described. The driver operates the ball 21 by the thumb or any other finger in either the X or Y direction with the steering wheel being held by the driver. To rotate the ball 21, the frictional force between the finger and the ball 21 needs to overcome the magnetic force that tries to rest the ball 21. Therefore, in order to rotate the ball 21, the driver needs to press the ball 21 with a finger while rotating. Accordingly, during an operation, the ball 21 cannot be pulled away from the rollers 40, 41, and 42.

The method of controlling in-vehicle devices using an in-vehicle device controller is now described. The driver first presses the button 402 provided in the steering wheel to select an in-vehicle device to be controlled. At this point, the in-vehicle device controller allows the display 3 to display the device to be controlled, according to the number of times the button 402 is pressed. In addition, the in-vehicle device controller switches a display of the display 3 and shows the current control object with voice (speech). By showing with voice, the driver can acknowledge the currently controlled in-vehicle device without viewing the display 3.

The driver manipulates the trackball 401 when the desired in-vehicle device is selected as a control object. Accordingly, the in-vehicle device controller controls movement of the in-vehicle device. For example, in the case of controlling an air-conditioning system, the in-vehicle device controller selects the air outlet or adjusts the temperature or the airflow volume when the trackball 21 is moved in the Y direction. If the trackball 21 is moved in the X direction, the in-vehicle device controller selects the setting of air outlet, temperature, or airflow volume. These are the same as those described in the first embodiment.

In the case of controlling an audio system, if the trackball 21 is moved in the forward direction of the Y axis, the in-vehicle device controller turns up the volume, and if the trackball 21 is moved in the reversed direction of the Y axis, the in-vehicle device controller turns down the volume. If the trackball 21 is moved in the X direction, the in-vehicle device controller allows the audio system to select a song to be played, according to the rotation angle of the trackball.

As described above, in the fourth embodiment, by providing a trackball in the steering wheel, the driver can easily control in-vehicle devices. In addition, because a trackball used in the fourth embodiment is the same as that used in the first embodiment, an operational feel is good compared to conventional trackballs.

The shaft bearings 46A, 46B, 47A, 47B, 48A, and 48B may include springs therein. With this configuration, when the ball 21 is pressed, the shafts 43, 44, and 45 respectively fixed to the rollers 40, 41, and 42 accordingly press the springs of the shaft bearings 46A, 46B, 47A, 47B, 48A, and 48B, and therefore the rollers 40, 41, and 42 can be in contact with the ball 21 at all times. Here, the force of the springs needs to be sufficiently weaker than the force applied to the ball 21 when the ball 21 is pressed due to magnetic force by the rollers 40, 42, and 42.

A trackball used in the fourth embodiment may be a trackball according to the second embodiment or may be a trackball according to the third embodiment.

As described above, in the present invention, a first magnet portion stabilizes a ball portion at predetermined rotation angles. In addition, a second magnet portion attracts the ball portion in the direction of the bottom surface of a case portion at all times. Therefore, even if applying a force to rotate the ball portion, because there is a force attracting the ball portion in the direction of the bottom surface of the case portion at all times, and because the ball portion is brought in close contact with a support portion for supporting the ball portion, it is possible to prevent the ball portion from coming in contact with the first magnet portion by an operation force, while still providing a crisp click to the user. Accordingly, the user can manipulates a trackball with a smooth feel and without rotational play while obtaining a crisp click and stability.

Such a trackball is advantageously used to control electronic devices, such as air-conditioners, navigation systems, and audio systems, even in environments in vehicles where vibration and movement are present.

By allowing the magnetic force of the second magnet portion to be greater than the magnetic force of the first magnet portion, the force that brings the ball portion in close contact with the support portion is allowed to act surely, making it possible to improve an operational feel.

By using a third magnet portion, the rotation angle at which a crisp click can be obtained can be set more minutely, and therefore when performing an operation with many options, good operational efficiency can be obtained and misoperation can be prevented. In addition, by switching between the presence and absence of the magnetic force of the third magnet portion, the frequency of a crisp click can be adjusted in accordance with the number of options, whereby the range of designing a menu increases and operational efficiency is further increased. Moreover, by automatically switching between the presence and absence of the magnetic force of the third magnet portion, depending on which parameter of a given electronic device is to be controlled, operability is further improved.

For example, the frequency of a crisp click can be changed according to the parameters of control menu screens for controlling electronic devices, and thus an operational feel of the menu becomes more natural and operational efficiency is improved.

By arranging a plurality of bar members made of an unmagnetized magnetic material on a plane and by limiting the rotation angle of the ball portion, a crisp click can be provided to the user for the rotation in one direction and a feel as if manipulating a joy stick (such that the ball portion tries to return to the original position) can be provided to the user for the rotation in the other direction. For example, the operation based on the ball portion's return to the original position may be assigned with a selection item which allows for relatively few options, whereas a crisp-clicked operation may be assigned with a selection item which provides a relatively greater number of options, thereby enabling the user to quickly select a value or option. In addition, this provides the user different operational feels depending on the operation direction, and therefore it is possible to prevent misoperation. Further, this stabilizes the ball portion, and thus it is possible to prevent misoperation caused by a shake, vibration or movement in the vehicle.

Trackballs according to the present invention and in-vehicle device controllers using the trackballs can provide a stable operational feel to the user, and are advantageously used as devices for controlling electronic devices.

While the invention has been described in detail, the foregoing description is in all aspects illustrative and not restrictive. It is to be understood that numerous other modifications and variations can be devised without departing from the scope of the invention.

What is claimed is:

1. A trackball for inputting operation information to electronic devices, said trackball comprising:

a ball portion which is magnetically coupleable in directions of a first axis, a second axis, and a third axis, the first, second and third axes intersecting with each other at the center of said ball portion and being orthogonal to each other, said ball portion comprising first to third bar members arranged on the first to third axes, respectively, and being made of an unmagnetized magnetic material;

a case portion for enclosing said ball portion such that an upper portion of said ball portion is exposed;

a first magnet portion for stabilizing said ball portion at predetermined rotation angles by magnetically coupling to said ball portion in one of the axial directions, said first magnet portion allowing each of any two axes among the first to third axes which are present on the same plane to serve as a rotation axis of said ball portion; and a second magnet portion for attracting said ball portion in a direction orthogonal to a rotation axis of said ball portion, by magnetically coupling to said ball portion in an axial direction of one axis which is not present in the same plane and which is other than the any two axes among the first to third axes, wherein;

said first magnet portion comprises:

a first fixed magnet portion made up of a pair of first magnets for forming a first rotation axis by magnetically coupling to said first bar member, said first magnets being respectively fixed to side-surfaces of said case portion; and a second fixed magnet portion made up of a pair of second magnets for forming a second rotation axis by magnetically coupling to said third bar member, said third magnets being respectively fixed to side-surfaces of said case portion;

said second magnet portion comprises a third fixed magnet portion for attracting said second bar member by magnetically coupling to said second bar member, said third fixed magnet portion being fixed to a bottom-surface of said case portion;

said first and second fixed magnet portions each have a common pole directed toward a center of said ball portion; and said third fixed magnet portion has a pole opposite to that of said first and second fixed magnet portions directed toward the center of said ball portion.

2. The trackball according to claim 1, wherein said ball portion further comprises an even number of bar members arranged on an even number of axes, respectively, and made of an unmagnetized magnetic material, the even number of axes intersecting at an intersection point of any two axes among the first to third axes which are present on the same plane, and at equal angles.

3. The trackball according to claim 1, wherein said case portion is made of an unmagnetized magnetic material.

4. The trackball according to claim 1, further comprising a third magnet portion arranged at a location that makes a predetermined angle from any one of rotation axes formed by said first magnet portion, said third magnet portion being operable to stabilize said ball portion by magnetic coupling when said ball portion rotates around the any one of rotation axes.

5. The trackball according to claim 4, further comprises magnetic force switching means for switching between a presence and absence of a magnetic force of said third magnet portion.

6. The trackball according to claim 5, wherein said magnetic force switching means is for performing the switching in accordance with control parameters of the electronic devices.

7. The trackball according to claim 1, wherein the magnetic force of said second magnet portion is greater than that of each magnet in said first magnet portion.

8. The trackball according to claim 7, wherein the magnetic force of said second magnet portion is twice that of each magnet in said first magnet portion.

9. The trackball according to claim 1, wherein:

said ball portion is magnetically coupleable in directions of a plurality of axes on a plane made up of the first and second axes, the plurality of axes intersecting at an intersection point of the first and second axes; and said case portion is operable to expose the upper portion of said ball portion so as to restrict a rotation angle of said ball portion.

10. The trackball according to claim 9, wherein:

the plurality of axes are even in number;

said ball portion comprises:

an even number of a plurality of bar members arranged on the plurality of axes, respectively, and made of an unmagnetized magnetic material;

said first bar member, said second bar member, and said plurality of bar members are arranged with an equal angle therebetween; and said case portion is operable to expose the upper portion of said ball portion such that said ball portion rotates at an angle corresponding to an angle between said bar members.

11. An in-vehicle device controller comprising a trackball for inputting operation information to electronic devices mounted on a vehicle, wherein said trackball comprises:

a ball portion which is magnetically coupleable in directions of a first axis, a second axis, and a third axis, the first, second, and third axes intersecting with each other at the center of said ball portion and being orthogonal to each other, said ball portion comprising first to third bar members arranged on the first to third axes, respectively, and being made of an unmagnetized magnetic material;

a case portion for enclosing said ball portion such that an upper portion of said ball portion is exposed;

a first magnet portion for stabilizing said ball portion at predetermined rotation angles by magnetically coupling to said ball portion in one of the axial directions, said first magnet portion allowing each of any two axes among the first to third axes which are present on the same plane to serve as a rotation axis of said ball portion; and a second magnet portion for attracting said ball portion in a direction orthogonal to a rotation axis of said ball portion, by magnetically coupling to said ball portion in an axial direction of one axis which is not present in the same plane and which is other than the any two axes among the first to third axes, wherein:

said first magnet portion comprises:

a first fixed magnet portion made up of a pair of first magnets for forming a first rotation axis by magnetically coupling to said first bar member, said first magnets being respectively fixed to side-surfaces of said case portion; and a second fixed magnet portion made up of a pair of second magnets for forming a second rotation axis by magnetically coupling to said third bar member, said third magnets being respectively fixed to side-surfaces of said case portion, said second magnet portion comprises a third fixed magnet portion for attracting said second bar member by magnetically coupling to said second bar member, said third fixed magnet portion being fixed to a bottom-surface of said case portion;

said first and second fixed magnet portions each have a common pole directed toward a center of said ball portion; and said third fixed magnet portion has a pole opposite to that of said first and second fixed magnet portions directed toward the center of said ball portion.

12. The in-vehicle device controller according to claim 11, wherein said trackball is mounted on a steering-wheel portion of the vehicle.

* * * * *